US011840152B2

(12) United States Patent
Fisher et al.

(10) Patent No.: US 11,840,152 B2
(45) Date of Patent: Dec. 12, 2023

(54) SURVEY MIGRATION SYSTEM FOR VERTICAL TAKE-OFF AND LANDING (VTOL) UNMANNED AERIAL VEHICLES (UAVS)

(71) Applicant: AeroVironment, Inc., Arlington, VA (US)

(72) Inventors: Christopher Eugene Fisher, Leo, IN (US); Jason Sidharthadev Mukherjee, Simi Valley, CA (US); William Arden Lott, Simi Valley, CA (US); Eric James Aagaard, Los Angeles, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 27 days.

(21) Appl. No.: 17/576,732

(22) Filed: Jan. 14, 2022

(65) Prior Publication Data

US 2022/0185133 A1   Jun. 16, 2022

Related U.S. Application Data

(63) Continuation of application No. 16/867,344, filed on May 5, 2020, now Pat. No. 11,254,229, which is a
(Continued)

(51) Int. Cl.
*B60L 53/30* (2019.01)
*B64C 39/02* (2023.01)
(Continued)

(52) U.S. Cl.
CPC .............. *B60L 53/30* (2019.02); *B60L 53/51* (2019.02); *B64C 29/02* (2013.01); *B64C 39/024* (2013.01);
(Continued)

(58) Field of Classification Search
CPC ...... B60L 2200/10; B60L 53/30; B60L 53/51; B64C 29/02; B64C 39/024; B64D 1/02;
(Continued)

(56) References Cited

U.S. PATENT DOCUMENTS

| 2,151,128 A | 3/1939 | Looney |
| 2,961,189 A | 11/1960 | Doak |

(Continued)

FOREIGN PATENT DOCUMENTS

| CN | 1993264 A | 7/2007 |
| JP | 2005289128 A | 10/2005 |

(Continued)

OTHER PUBLICATIONS

International Search Report and Written Opinion for PCT/US14/36863, dated Mar. 20, 2015.
(Continued)

*Primary Examiner* — Tyler J Lee
(74) *Attorney, Agent, or Firm* — Concept IP LLP; Michael Zarrabian; Eric Aagaard

(57) ABSTRACT

A method of migrating unmanned aerial vehicle (UAV) operations between geographic survey areas, including: uploading a first plurality of flight missions into a first UAV pod; deploying the UAV pod; autonomously launching the UAV from the UAV pod a plurality of times to perform the first plurality of flight missions; providing first survey data from the UAV to the UAV pod; autonomously migrating the UAV from the first UAV pod to a second UAV pod; receiving a second plurality of flight missions in a second UAV pod; providing the UAV with one of the second plurality of flight missions from the second UAV pod; autonomously launching the UAV from the second UAV pod a plurality of times to perform the second plurality of flight missions; and providing a second survey data from the UAV to the second
(Continued)

UAV pod; where the autonomous migrating of the UAV to accomplish the first and second survey data happens autonomously and without active human intervention.

20 Claims, 12 Drawing Sheets

Related U.S. Application Data continuation of application No. 15/960,413, filed on Apr. 23, 2018, now Pat. No. 10,671,095, which is a continuation of application No. 15/040,985, filed on Feb. 10, 2016, now Pat. No. 9,977,435.

(60) Provisional application No. 62/115,086, filed on Feb. 11, 2015.

(51) Int. Cl.

| | | |
|---|---|---|
| *B64D 1/02* | (2006.01) | |
| *G05D 1/00* | (2006.01) | |
| *G08G 5/00* | (2006.01) | |
| *B60L 53/51* | (2019.01) | |
| *B64C 29/02* | (2006.01) | |
| *B64D 47/08* | (2006.01) | |
| *B64F 1/22* | (2006.01) | |
| *G05D 1/10* | (2006.01) | |
| *B64U 10/25* | (2023.01) | |
| *B64U 30/10* | (2023.01) | |
| *B64U 50/13* | (2023.01) | |
| *B64U 50/19* | (2023.01) | |
| *B64U 70/80* | (2023.01) | |
| *B64U 80/70* | (2023.01) | |
| *B64U 101/30* | (2023.01) | |
| *G06T 11/60* | (2006.01) | |

(52) U.S. Cl.
CPC .............. *B64D 1/02* (2013.01); *B64D 47/08* (2013.01); *B64F 1/222* (2013.01); *G05D 1/0088* (2013.01); *G05D 1/102* (2013.01); *G08G 5/0034* (2013.01); *G08G 5/0039* (2013.01); *G08G 5/0069* (2013.01); *G08G 5/0091* (2013.01); *B60L 2200/10* (2013.01); *B64U 10/25* (2023.01); *B64U 30/10* (2023.01); *B64U 50/13* (2023.01); *B64U 50/19* (2023.01); *B64U 70/80* (2023.01); *B64U 80/70* (2023.01); *B64U 2101/30* (2023.01); *B64U 2201/10* (2023.01); *G06T 11/60* (2013.01)

(58) Field of Classification Search
CPC ......... B64D 47/08; B64F 1/222; B64U 10/25; B64U 2101/30; B64U 2201/10; B64U 30/10; G05D 1/0088; G05D 1/102; G08G 5/0034; G08G 5/0039; G08G 5/0069
See application file for complete search history.

(56) References Cited

U.S. PATENT DOCUMENTS

| | | | |
|---|---|---|---|
| 3,181,810 A | 5/1965 | Olson | |
| 3,527,431 A | 9/1970 | Wright | |
| 4,116,408 A | 9/1978 | Soloy | |
| 4,410,151 A | 10/1983 | Hoppner et al. | |
| 4,700,653 A | 10/1987 | Harris et al. | |
| 4,814,711 A | 3/1989 | Olsen et al. | |
| 5,062,587 A | 11/1991 | Wernicke | |
| 5,289,994 A | 3/1994 | Aguilera | |
| 5,311,436 A | 5/1994 | Trennel | |
| 5,419,514 A | 5/1995 | Ducan | |
| 5,560,568 A | 10/1996 | Schmittle | |
| 5,577,687 A | 11/1996 | Downing | |
| 5,765,783 A | 6/1998 | Albion | |
| 5,950,372 A | 9/1999 | Al-Sabah et al. | |
| 6,056,237 A | 5/2000 | Woodland | |
| 6,079,668 A | 6/2000 | Brown | |
| 6,229,299 B1 | 5/2001 | Strashny | |
| 6,371,410 B1 | 4/2002 | Cairo-Iocco et al. | |
| 6,467,726 B1 | 10/2002 | Hosoda | |
| 6,868,314 B1 | 3/2005 | Frink | |
| 7,059,566 B2 | 6/2006 | Byers et al. | |
| 7,248,018 B2 | 7/2007 | Sanders, Jr. et al. | |
| 7,299,925 B1 | 11/2007 | Ansay et al. | |
| 7,472,863 B2 | 1/2009 | Pak | |
| 7,766,274 B1 | 8/2010 | Jameson et al. | |
| 8,146,855 B2 | 4/2012 | Smailov | |
| 8,297,552 B2 | 10/2012 | Ying | |
| 8,376,264 B1 | 2/2013 | Hong et al. | |
| 8,437,879 B2 * | 5/2013 | Anderson ............. | G06Q 10/06 56/10.2 D |
| 8,439,301 B1 | 5/2013 | Lussier et al. | |
| 8,453,962 B2 | 6/2013 | Shaw | |
| 8,511,606 B1 | 8/2013 | Lutke et al. | |
| 8,590,828 B2 | 11/2013 | Marcus | |
| 8,602,348 B2 | 12/2013 | Bryant | |
| 8,616,492 B2 | 12/2013 | Oliver | |
| 8,695,916 B2 | 4/2014 | Martin et al. | |
| 8,733,690 B2 | 5/2014 | Bevirt et al. | |
| 8,800,912 B2 | 8/2014 | Oliver | |
| 8,979,032 B1 | 3/2015 | Hester et al. | |
| 9,056,676 B1 | 6/2015 | Wang | |
| 9,102,401 B2 | 8/2015 | Collins et al. | |
| 9,139,310 B1 | 9/2015 | Wang | |
| 9,164,506 B1 | 10/2015 | Zang | |
| 9,302,783 B2 | 4/2016 | Wang | |
| 9,382,003 B2 | 7/2016 | Burema et al. | |
| 9,387,928 B1 | 7/2016 | Gentry et al. | |
| 9,429,945 B2 | 8/2016 | Pulleti et al. | |
| 9,457,915 B2 | 10/2016 | Wang | |
| 9,527,588 B1 | 12/2016 | Rollefstad | |
| 9,527,605 B1 | 12/2016 | Gentry et al. | |
| 9,545,852 B2 | 1/2017 | Streett | |
| 9,561,871 B2 | 2/2017 | Sugumaran | |
| 9,623,760 B2 | 4/2017 | Wang et al. | |
| 9,678,507 B1 | 6/2017 | Douglas et al. | |
| 9,718,564 B1 | 8/2017 | Beckman et al. | |
| 9,845,020 B2 | 12/2017 | Streett | |
| 9,880,563 B2 | 1/2018 | Fisher et al. | |
| 9,928,749 B2 | 3/2018 | Gil et al. | |
| 9,977,435 B2 | 5/2018 | Fisher et al. | |
| 10,124,912 B2 | 11/2018 | Walsh et al. | |
| 10,336,470 B2 | 7/2019 | Fisher et al. | |
| 10,351,261 B1 | 7/2019 | Bryant | |
| 10,457,421 B2 | 10/2019 | O'Toole | |
| 10,467,685 B1 | 11/2019 | Brisson et al. | |
| 10,534,372 B2 | 1/2020 | Fisher et al. | |
| 2005/0006525 A1 | 1/2005 | Byers et al. | |
| 2005/0066806 A1 | 3/2005 | Helms et al. | |
| 2005/0178879 A1 | 8/2005 | Mao | |
| 2005/0231157 A1 | 10/2005 | Sanders et al. | |
| 2006/0192046 A1 | 8/2006 | Heath et al. | |
| 2006/0249622 A1 | 11/2006 | Steele | |
| 2006/0249623 A1 | 11/2006 | Steele | |
| 2006/0261207 A1 | 11/2006 | Woodruff et al. | |
| 2007/0072639 A1 | 3/2007 | Frost et al. | |
| 2007/0221780 A1 | 9/2007 | Builta | |
| 2007/0221785 A1 | 9/2007 | Diamandis et al. | |
| 2009/0236470 A1 | 9/2009 | Goossen et al. | |
| 2009/0294573 A1 | 12/2009 | Wilson et al. | |
| 2010/0131121 A1 | 5/2010 | Gerlock | |
| 2010/0157055 A1 | 6/2010 | Pechatnikov | |
| 2010/0168949 A1 | 7/2010 | Malecki et al. | |
| 2010/0252690 A1 | 10/2010 | Hothi et al. | |
| 2010/0266994 A1 | 10/2010 | Gregoire et al. | |
| 2011/0042509 A1 | 2/2011 | Bevirt et al. | |
| 2011/0168838 A1 | 7/2011 | Hornback et al. | |
| 2011/0174925 A1 | 7/2011 | Ying | |
| 2011/0180673 A1 | 7/2011 | Lim | |
| 2011/0226898 A1 | 9/2011 | Smith et al. | |
| 2011/0264314 A1 | 10/2011 | Parras | |

(56) References Cited

U.S. PATENT DOCUMENTS

| | | |
|---|---|---|
| 2011/0303795 A1 | 12/2011 | Oliver |
| 2011/0315809 A1 | 12/2011 | Oliver |
| 2011/0315810 A1 | 12/2011 | Petrov |
| 2012/0001020 A1 | 1/2012 | Miralles et al. |
| 2012/0043413 A1 | 2/2012 | Smith |
| 2012/0050090 A1 | 3/2012 | Rudnisky et al. |
| 2012/0063897 A1 | 3/2012 | Brunken |
| 2012/0080556 A1 | 4/2012 | Root |
| 2012/0091257 A1 | 4/2012 | Wolff et al. |
| 2012/0210853 A1 | 8/2012 | Abershitz et al. |
| 2012/0215382 A1 | 8/2012 | Lee et al. |
| 2012/0248259 A1 | 10/2012 | Page et al. |
| 2012/0271491 A1 | 10/2012 | Spata |
| 2012/0318915 A1 | 12/2012 | Gatzke |
| 2013/0161447 A1 | 6/2013 | McGeer et al. |
| 2013/0176423 A1 | 7/2013 | Rischmuller et al. |
| 2013/0318214 A1 | 11/2013 | Tebay et al. |
| 2013/0341461 A1 | 12/2013 | McCollough et al. |
| 2014/0032034 A1 | 1/2014 | Raptopoulos et al. |
| 2014/0042042 A1 | 2/2014 | DeVaul et al. |
| 2014/0061376 A1 | 3/2014 | Fisher et al. |
| 2014/0124621 A1 | 5/2014 | Godzdanker et al. |
| 2014/0126838 A1 | 5/2014 | Schultz et al. |
| 2014/0151502 A1 | 6/2014 | Kosheleff |
| 2014/0163781 A1* | 6/2014 | Vian ............... G01S 7/4802 701/3 |
| 2014/0236390 A1 | 8/2014 | Mohamadi |
| 2014/0249693 A1* | 9/2014 | Stark ............... B64D 47/02 701/2 |
| 2014/0277834 A1 | 9/2014 | Levien et al. |
| 2014/0312169 A1 | 10/2014 | Fisher et al. |
| 2014/0316616 A1* | 10/2014 | Kugelmass ........ G05D 1/104 701/8 |
| 2014/0343752 A1 | 11/2014 | Fisher et al. |
| 2014/0350748 A1 | 11/2014 | Fisher et al. |
| 2015/0014475 A1 | 1/2015 | Taylor et al. |
| 2015/0102157 A1 | 4/2015 | Godlasky et al. |
| 2015/0136897 A1 | 5/2015 | Seibel et al. |
| 2015/0158598 A1 | 6/2015 | You |
| 2015/0236636 A1 | 8/2015 | Sade |
| 2015/0254738 A1 | 9/2015 | Wright et al. |
| 2015/0321758 A1 | 11/2015 | Peter |
| 2015/0336669 A1 | 11/2015 | Kantor et al. |
| 2015/0353206 A1 | 12/2015 | Wang |
| 2016/0009413 A1 | 1/2016 | Lee et al. |
| 2016/0011592 A1 | 1/2016 | Zhang et al. |
| 2016/0019794 A1 | 1/2016 | Dominic et al. |
| 2016/0033966 A1 | 2/2016 | Farris et al. |
| 2016/0039542 A1 | 2/2016 | Wang |
| 2016/0068265 A1 | 3/2016 | Hoareau et al. |
| 2016/0101876 A1 | 4/2016 | Wolfe |
| 2016/0117931 A1 | 4/2016 | Chan et al. |
| 2016/0137311 A1 | 5/2016 | Peverill et al. |
| 2016/0144734 A1 | 5/2016 | Wang et al. |
| 2016/0144978 A1 | 5/2016 | Cheron |
| 2016/0157414 A1 | 6/2016 | Ackerman et al. |
| 2016/0185466 A1 | 6/2016 | Dreano |
| 2016/0196756 A1 | 7/2016 | Prakash et al. |
| 2016/0214712 A1 | 7/2016 | Fisher et al. |
| 2016/0229299 A1 | 8/2016 | Streett |
| 2016/0247404 A1 | 8/2016 | Srivastava et al. |
| 2016/0253808 A1 | 9/2016 | Metzler et al. |
| 2016/0257401 A1 | 9/2016 | Buchmueller et al. |
| 2016/0358432 A1 | 12/2016 | Branscomb et al. |
| 2016/0364989 A1 | 12/2016 | Speasl et al. |
| 2016/0376031 A1 | 12/2016 | Michalski et al. |
| 2017/0015438 A1 | 1/2017 | Harding et al. |
| 2017/0021923 A1 | 1/2017 | Fisher et al. |
| 2017/0021941 A1 | 1/2017 | Fisher et al. |
| 2017/0021942 A1 | 1/2017 | Fisher et al. |
| 2017/0023949 A1 | 1/2017 | Fisher et al. |
| 2017/0027155 A1 | 2/2017 | Ehrlich et al. |
| 2017/0083979 A1 | 3/2017 | Winn et al. |
| 2017/0101017 A1 | 4/2017 | Streett |
| 2017/0144776 A1 | 5/2017 | Fisher et al. |
| 2017/0158353 A1 | 6/2017 | Schmick |
| 2017/0160740 A1 | 6/2017 | Srivastava et al. |
| 2017/0161968 A1 | 6/2017 | Xie et al. |
| 2017/0177006 A1 | 6/2017 | Fisher et al. |
| 2017/0186329 A1 | 6/2017 | Gao et al. |
| 2017/0190260 A1 | 7/2017 | Wang et al. |
| 2017/0190443 A1 | 7/2017 | Fisher et al. |
| 2017/0203857 A1 | 7/2017 | O'Toole |
| 2017/0225799 A1 | 8/2017 | Selwyn et al. |
| 2017/0225802 A1 | 8/2017 | Lussier et al. |
| 2017/0227965 A1 | 8/2017 | DeCenzo et al. |
| 2017/0259917 A1 | 9/2017 | Winn et al. |
| 2018/0244383 A1 | 8/2018 | Valente et al. |
| 2018/0370652 A1 | 12/2018 | Vendrame et al. |

FOREIGN PATENT DOCUMENTS

| | | |
|---|---|---|
| JP | 2009083798 A | 4/2009 |
| JP | 2012198883 A | 10/2012 |
| WO | 2006022654 A1 | 3/2006 |
| WO | 2009066073 A1 | 5/2009 |
| WO | 2011159281 A1 | 12/2011 |
| WO | 2015012935 A2 | 1/2015 |

OTHER PUBLICATIONS

International Search Report and Written Opinion for PCT/US16/17407 dated Jul. 27, 2016.

International Search Report and Written Opinion for serial No. PCT/US16/17400, dated May 12, 2016.

International Search Report for PCT/US16/17417 dated Jul. 27, 2016.

International Search Report for PCT/US16/17540 dated May 23, 2016.

International Search Report for PCT/US16/17614 dated May 19, 2016.

Dosedo, Konno, Matumoto, Go, Masuko, Abiko, and Uchiyama, "Design and Simulation of a Quad Rotor Tail-Sitter Unmanned Aerial Vehicle," Tohoku University, IEEE, 2010, 978-1-4244-9315-9/10.

* cited by examiner

SURVEY MIGRATION SYSTEM FOR VERTICAL TAKE-OFF AND LANDING (VTOL) UNMANNED AERIAL VEHICLES (UAVS)

CROSS-REFERENCE TO RELATED APPLICATIONS

This application claims priority to and the benefit of U.S. patent application Ser. No. 16/867,344, filed May 5, 2020, which claims priority to and the benefit of U.S. patent application Ser. No. 15/960,413, filed Apr. 23, 2018, which issued as U.S. Pat. No. 10,671,095 on Jun. 2, 2020, which claims priority to and the benefit of U.S. patent application Ser. No. 15/040,985, filed Feb. 10, 2016, which issued as U.S. Pat. No. 9,977,435 on May 22, 2018, which claims priority to U.S. Provisional Patent Application No. 62/115,086, filed Feb. 11, 2015, the contents of all of which are hereby incorporated by reference herein for all purposes.

TECHNICAL FIELD

The field of the invention relates to unmanned aerial vehicle (UAV) systems, and more particularly to systems for operating a UAV autonomously.

BACKGROUND

Aerial geographic survey work for the agricultural and oil industries incur the logistics and costs of personnel to operate and maintain the air vehicle as well as collect and process the associated data. These costs are typically compounded by need for a substantial amount of this work to be performed at, or relatively near to, the location of the survey, which typically is well removed from any population centers. As a result it is advantageous to increase automation, reliability (reduce complexity), range, and capability of an air vehicle and support system for performing such data retrieval and processing tasks.

SUMMARY

Exemplary method embodiments may include a method of migrating unmanned aerial vehicle (UAV) operations between geographic survey areas, including: uploading a first plurality of flight missions into a first UAV pod; deploying the UAV pod; autonomously launching the UAV from the UAV pod a plurality of times to perform the first plurality of flight missions; providing first survey data from the UAV to the UAV pod; autonomously migrating the UAV from the first UAV pod to a second UAV pod; receiving a second plurality of flight missions in a second UAV pod; providing the UAV with one of the second plurality of flight missions from the second UAV pod; autonomously launching the UAV from the second UAV pod a plurality of times to perform the second plurality of flight missions; and providing a second survey data from the UAV to the second UAV pod; where the autonomous migrating of the UAV to accomplish the first and second survey data happens autonomously and without active human intervention.

Additional exemplary method embodiments may include performing data analysis of the first and second survey data; and providing the data analysis to the customer. Additional exemplary method embodiments may include processing, by a first processor of the first UAV pod, the provided first survey data, where the processing may include at least one of: converting the provided first survey data into one or more viewable images with accompanying geospatial location and stitching the one or more images into an orthomosaic. Additional exemplary method embodiments may include charging a battery of the UAV in the first UAV pod; and charging the battery of the UAV in the second UAV pod. Additional exemplary method embodiments may include storing the provided first survey data in a UAV pod memory of the first UAV pod; and storing the provided second survey data in a UAV pod memory of the second UAV pod. Additional exemplary method embodiments may include determining, by a first weather sensor in communication with a first processor of the first UAV pod, a flight decision based on a measurement of the external environment prior to each autonomous launch of the UAV from the first UAV pod; and determining, by a second weather sensor in communication with a second processor of the second UAV pod, a flight decision based on a measurement of the external environment prior to each autonomous launch of the UAV from the second UAV pod.

Additional exemplary method embodiments may include autonomously landing the UAV in the first UAV pod a plurality of times after each of the performed first plurality of flight missions; and autonomously landing the UAV in the second UAV pod a plurality of times after each of the performed second plurality of flight missions. Additional exemplary method embodiments may include autonomously routing the UAV to a local area network (LAN) for wireless transmission of at least one of: the first survey data and the second survey data by a transceiver of the UAV. In additional exemplary method embodiments, at least one of the first plurality of flight missions may include dropping a payload by the UAV and/or loitering the UAV over an event of interest. Additional exemplary method embodiments may include determining a UAV battery power level during the first plurality of flight missions; and autonomously re-routing the UAV to the first UAV pod if the determined UAV battery power level drops below a predetermined voltage threshold.

Additional exemplary method embodiments may include uploading a third plurality of flight missions into the first UAV pod; autonomously launching a second UAV from the first UAV pod a plurality of times to perform the third plurality of flight missions; providing third survey data from the second UAV to the first UAV pod; autonomously migrating the second UAV from the first UAV pod to the second UAV pod; receiving a fourth plurality of flight missions in the second UAV pod; providing the second UAV with one of the fourth plurality of flight missions from the second UAV pod; autonomously launching the second UAV from the second UAV pod a plurality of times to perform the fourth plurality of flight missions; and providing a fourth survey data from the second UAV to the second UAV pod; where the autonomous migrating of the second UAV to accomplish the third and fourth survey data happens autonomously and without active human intervention.

Exemplary system embodiments may include an unmanned aerial vehicle (UAV) surveying system including: a first region having one or more UAV pods; a second region having one or more UAV pods; a UAV having a UAV processor, wherein the UAV processor can: receive one or more flight missions from a UAV pod in the first region; provide flight survey data from the received one or more flight missions to the UAV pod in the first region; migrate the UAV from the UAV pod in the first region to a UAV pod in the second region; receive one or more flight missions from the UAV pod in the second region; and provide flight survey data from the received one or more flight missions to the UAV pod in the second region. In additional exemplary system embodiments, the UAV may be a vertical takeoff and landing (VTOL) UAV. In additional exemplary system embodiments, the received one or more flight missions may include at least one of: waypoints, altitude, flight speed, sensor suite configuration data, launch time, launch day, and mission sensor go and no-go parameters.

Additional exemplary system embodiments may include a first transceiver of the UAV; and a second transceiver of the UAV pod in the first region; and a third transceiver of the UAV pod in the second region; where the provided flight survey data from the one or more flight missions in the first region may be sent by the first transceiver of the UAV and received by the second transceiver of the UAV pod in the first region; and where the provided flight survey data from the one or more flight missions in the second region may be sent by the first transceiver of the UAV and received by the third transceiver of the UAV pod in the second region. Additional exemplary system embodiments may include a weather sensor in communication with a processor of the UAV pod in the first region; where the processor of the UAV pod in the first region determines a UAV flight decision based on a measurement of the external environment by the weather sensor prior to each launch of the UAV from the UAV pod in the first region. In additional exemplary system embodiments, the migration of the UAV from the UAV pod in the first region to the UAV pod in the second region happens autonomously and without active human intervention.

Additional exemplary method embodiments may include a method of migrating unmanned aerial vehicle (UAV) operations between geographic survey areas, including: launching, from a first location, a UAV having a portable UAV pod, where the portable UAV pod is attached to the UAV at launch; flying the UAV having the portable UAV pod to a second location; landing the UAV having the portable UAV pod at the second location; and detaching the UAV from the UAV pod. Additional exemplary method embodiments may include the portable UAV pod folds up after launching and unfolds prior to landing. Additional exemplary method embodiments may include the portable UAV pod having one or more solar panels for charging the UAV. Additional exemplary method embodiments may include charging a battery of the UAV in the first UAV pod prior to launch. Additional exemplary method embodiments may include determining, by a weather sensor in communication with a processor of the UAV pod, a flight decision based on a measurement of the external environment by the weather sensor prior to launching the UAV from the first location. In additional exemplary method embodiments, flying the UAV having the portable UAV pod to the second location happens autonomously and without active human intervention.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

A vertical takeoff and landing (VTOL) unmanned aerial vehicle (UAV) system is disclosed that provides for improved remote geographic survey capabilities. Multiple autonomous mission launches and landings may be accomplished using a two-rotor VTOL UAV that is capable of efficient horizontal flight, and a UAV pod having a UAV pod processor, with the UAV selectively enclosed in the UAV pod for protection against the external environment when not in use, recharging and/or transferring data.

An operating method is disclosed for migrating UAV operations between geographic survey areas. The method may use multi-aircraft UAV pods to initiate UAV surveys across disparate geographic areas that have pre-positioned single-UAV pods for receipt and provisioning of the migrating survey UAVs. A UAV may be launched from a first UAV pod in a first geographic area to perform a first set of flight missions and return survey data to the first UAV pod. The UAV may then be autonomously migrated to a second UAV pod in a second geographic area. The UAV may then perform a second set of flight missions and return survey data from this second set of flight missions to the second UAV pod. The UAV may autonomously move to various geographic areas to perform various tasks that may then be analyzed and provided to a customer.

Exemplary UAV Pod and UAV Structure

Figure 1:
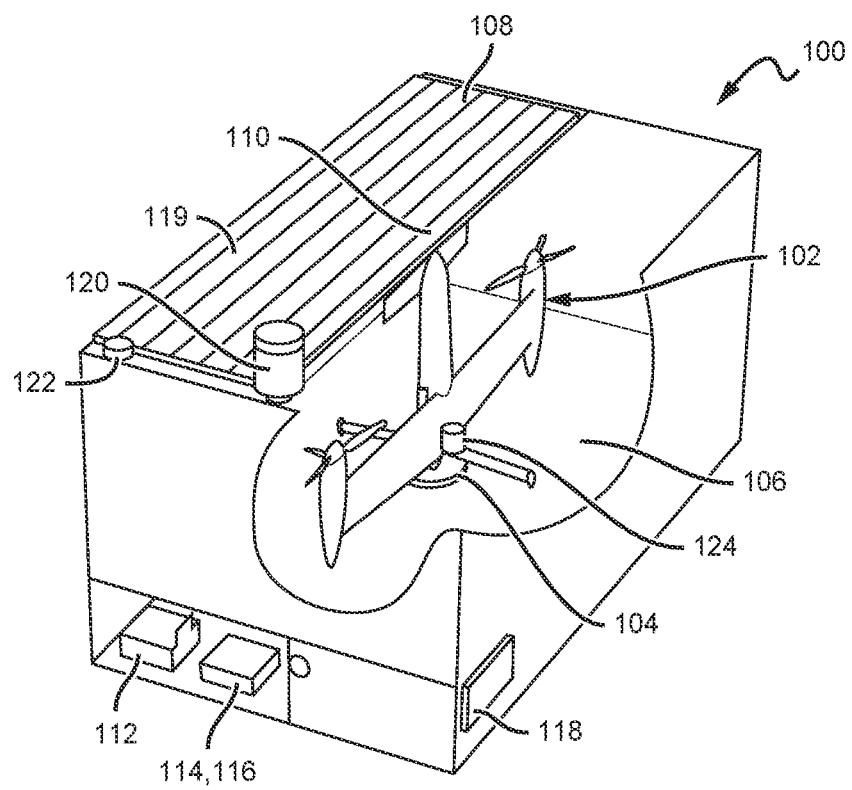
FIG. 1 is a perspective view of one embodiment of a UAV pod that may house and protect an extended range VTOL UAV to accomplish multiple autonomous launches, landings and data retrieval missions.

FIG. 1 is a perspective view of one embodiment of a UAV pod that may house and protect an extended range VTOL UAV to accomplish multiple autonomous launches, landings and data retrieval missions. The illustrated system 100 has a winged two rotor UAV 102 seated on a landing surface 104 of an interior 106 of the UAV pod 108. The UAV 102 is seated in a vertical launch position to facilitate later launch out of the UAV pod 108. The UAV pod 108 may selectively enclose the UAV 102, such as through the use of a UAV pod protective cover 110. The cover 110 may be a two-part hinged cover that is operable to close to protect the UAV 102 from the external environment or to open to enable launch of the UAV 102. The UAV pod 108 may have a short-range UAV pod transceiver 112 that may be seated in a compartment below the landing surface 104, within their own separate compartments, or may be seated elsewhere within the UAV pod 108 for protection from the external environment. The UAV pod transceiver 112 may receive UAV flight telemetry such as UAV flight and trajectory information, UAV battery status information and sensor data (such as video), and other data transmitted by the UAV 102. The UAV pod transceiver 112 may also transmit flight control data such as navigation (e.g., re-routing instructions) to the UAV 102. A UAV pod processor 114 may also be housed within the UAV pod 108 to accomplish, among other functions, providing the UAV 102 with a plurality of missions, receiving flight survey data from the UAV 102, monitoring the UAV pod 108 for overhead obstacles, monitoring the external environment such as the weather through the weather sensor, monitoring the trajectory of the UAV 102, and providing navigation instructions to the UAV 102 in response to receiving UAV battery status or other flight warning condition data inputs.

A UAV pod memory 116 may also be housed within the UAV pod 108 for storing UAV flight mission information and geographic survey data. A battery 118 may be enclosed in the UAV pod for recharging the UAV 102 and for providing power to the UAV pod 108 such as for use by the processor 114 and cover motor (not shown). The battery 118 may be rechargeable such as through solar panels 119, or may be a permanent battery such as a 12-Volt deep cycle marine battery. In an alternative embodiment, the battery 118 may be a fuel cell. In some embodiments, the UAV pod 108 will use the solar panels 119 to charge the battery 118 to later charge the battery of the UAV 102. Typically, the UAV pod 108 will be charging the battery 118 while the UAV 102 is out of the pod 108 executing a mission and will recharge the UAV 102 upon its return to the UAV pod 108.

A weather sensor 120 in communication with the UAV pod processor 114 may extend from an exterior of the UAV pod 108 to enable accurate measurement of the external environment, such as wind speed, temperature and barometric pressure. A proximity sensor or sensors may also be provided (122, 124) and in communication with the UAV pod processor 114 to enable go and no-go flight decisions based on the proximity of any objects or other obstructions positioned over the UAV pod cover 110. The UAV pod 108 is preferably weather hardened to enable extended outdoor use regardless of weather variations.

Figure 2:
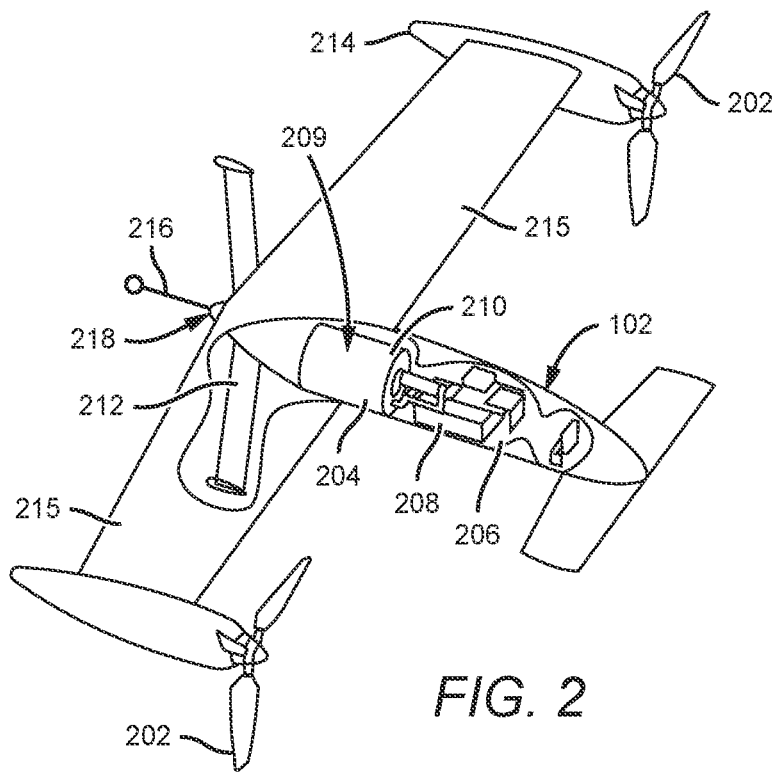
FIG. 2 is a perspective view of the two-rotor UAV first illustrated in FIG. 1.

FIG. 2 is a perspective view of the two-rotor UAV 102 first illustrated in FIG. 1. The UAV 102 has only two rotors 202, enabling vertical takeoff and landing (VTOL) missions out of the UAV pod 108 (see FIG. 1). The UAV 102 has a UAV transceiver 204 within a UAV fuselage 206. A UAV processor 208 is also seated in the UAV 102 and in communication with the UAV transceiver 204. The UAV 102 also includes a battery 209 for providing power to the rotor motors and the electronics, including the processor 208. The UAV processor 208 is configured to receive a plurality of flight mission information that may include waypoints, altitude, flight speed, sensor suite configuration data, launch day/time and mission weather sensor go and no-go parameters. The UAV 102 may have a variety of electrical optical (EO) sensors 210, such as LiDAR, RADAR, infrared, visible-spectrum cameras, or other active or passive sensors that may be used to detect soil moisture, crop density, crop health, terrain, or other objects or qualities of interest. The UAV 102 may have a rear landing gear 212 extending off of a rear of the fuselage 206 that may be used in combination with UAV engine nacelles 214 to enable a four-point landing for more stable landings on the UAV pod 108 (see FIG. 1). The landing gear 212 may also function as a flight surface or aerodynamic surface, such as a vertical stabilizer, providing corrective (passive) forces to stabilize the UAV 102 in flight, such as to stabilize in a yaw direction. The UAV 102 may have wings 215 to provide the primary source of lift during the UAV cruise (e.g., horizontal flight), while the two rotors 202 provide the primary source of lift during the VTOL phases of UAV flight. This combination of wing and rotor use allows for efficient flight while collecting flight survey data, which increases the range and/or duration of a particular flight while also allowing the UAV 102 to land and take off from the relatively small UAV pod 108 (see FIG. 1) landing area. In one embodiment, the UAV 102 may take off and land vertically using the two rotors 202 that themselves are operable to lift the UAV 102 vertically upwards, transition the UAV 102 to horizontal flight to conduct its survey or other flight mission, and then transition it back to vertical flight to land the UAV 102 vertically downwards, with attitudinal control for the UAV 102 in all modes of flight (vertical and horizontal) coming entirely from the rotors 202 (as driven by a means of propulsion) without the benefit or need of aerodynamic control surfaces, such as ailerons, an elevator, or a rudder. One such UAV 102 is described in international patent application number PCT/US14/36863 filed May 5, 2014, entitled "Vertical Takeoff and Landing (VTOL) Air Vehicle" and is incorporated by reference in its entirety herein for all purposes. Such a UAV 102 benefits from a more robust structure by reducing the opportunity for damage to control surfaces (i.e., there aren't any), and may be made lighter and with less complexity.

The UAV 102 may also be provided with a rearward facing tang 216 extending off of a rear portion 218 of the fuselage 206 in lieu of or in addition to rear landing gear 212. Such rearward-facing tang 216 may be metallic or have metallic contacts for receipt of electrical signals (i.e., data) and/or power for charging the UAV's battery 209.

Figure 3:
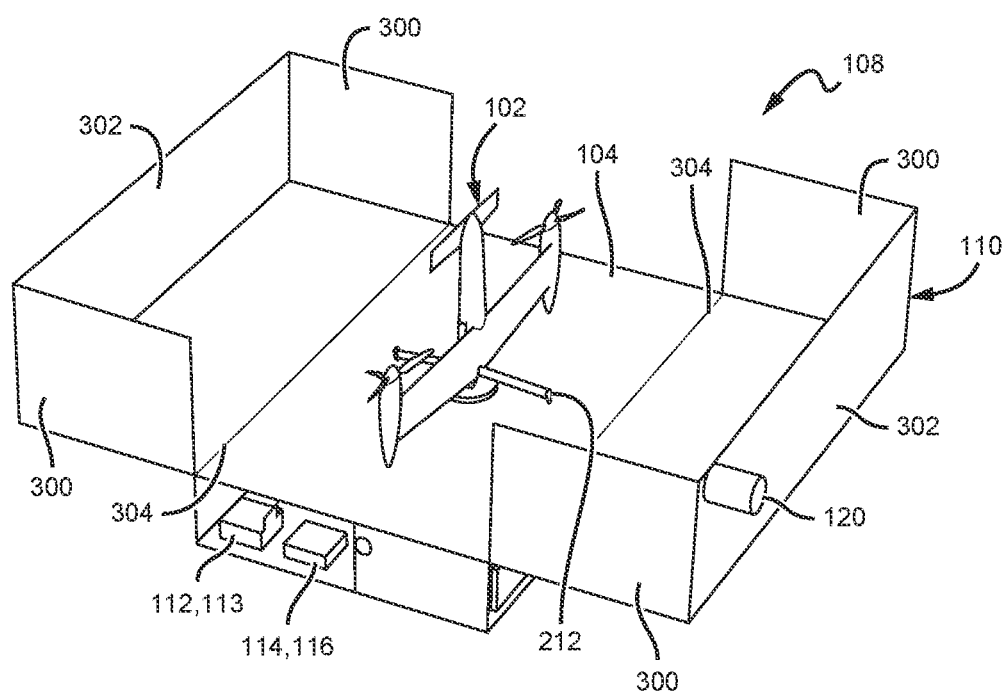
FIG. 3 illustrates the UAV pod in its open configuration.

FIG. 3 illustrates the UAV pod 108 in its open configuration. In FIG. 3, the UAV 102 is illustrated in its vertical configuration and seated on a landing surface 104 of the UAV pod 108. The UAV 102 is shown positioned at least generally aligned with the rectangular dimensions of the UAV pod 108. In embodiments, the landing surface 104 is rotatable to position the UAV. In FIG. 3, the cover 110 is open to enable unobstructed launch, and later landing, of the UAV 102. The cover 110 is illustrated with side portions 300 and top portions 302, with hinges 304. In an alternative embodiment, only the top portions 302 are hinged to enable unobstructed launch of the UAV 102. Alternatively, the top portions 302 may translate out of the flight path linearly or using a mechanism and motion so that the UAV is free to launch. In one embodiment, the landing gear 212 may be omitted and the UAV 102 may be guided into and out of one or more slots, guide rails, channels, or other guiding structure to both secure the UAV 102 during its landed state and enable landing. The weather sensor 120 may be coupled to the cover 110 or may extend off the side of the UAV pod 108 (not shown). Also, although the UAV pod 108 is illustrated having a rectangular cross-section and a box-like structure, the UAV pod 108 may take the form of a dome-shaped structure or other configuration that enables stable placement and protection for the selectively enclosed UAV. The cover 110 can include solar panels on its exterior (not shown), and in some embodiments one or both of the covers 110 can be positioned, and moved, about the hinges 304 to be perpendicular to the sun's rays to maximize the collection of solar energy.

Business Methods of Operation

Figure 4:
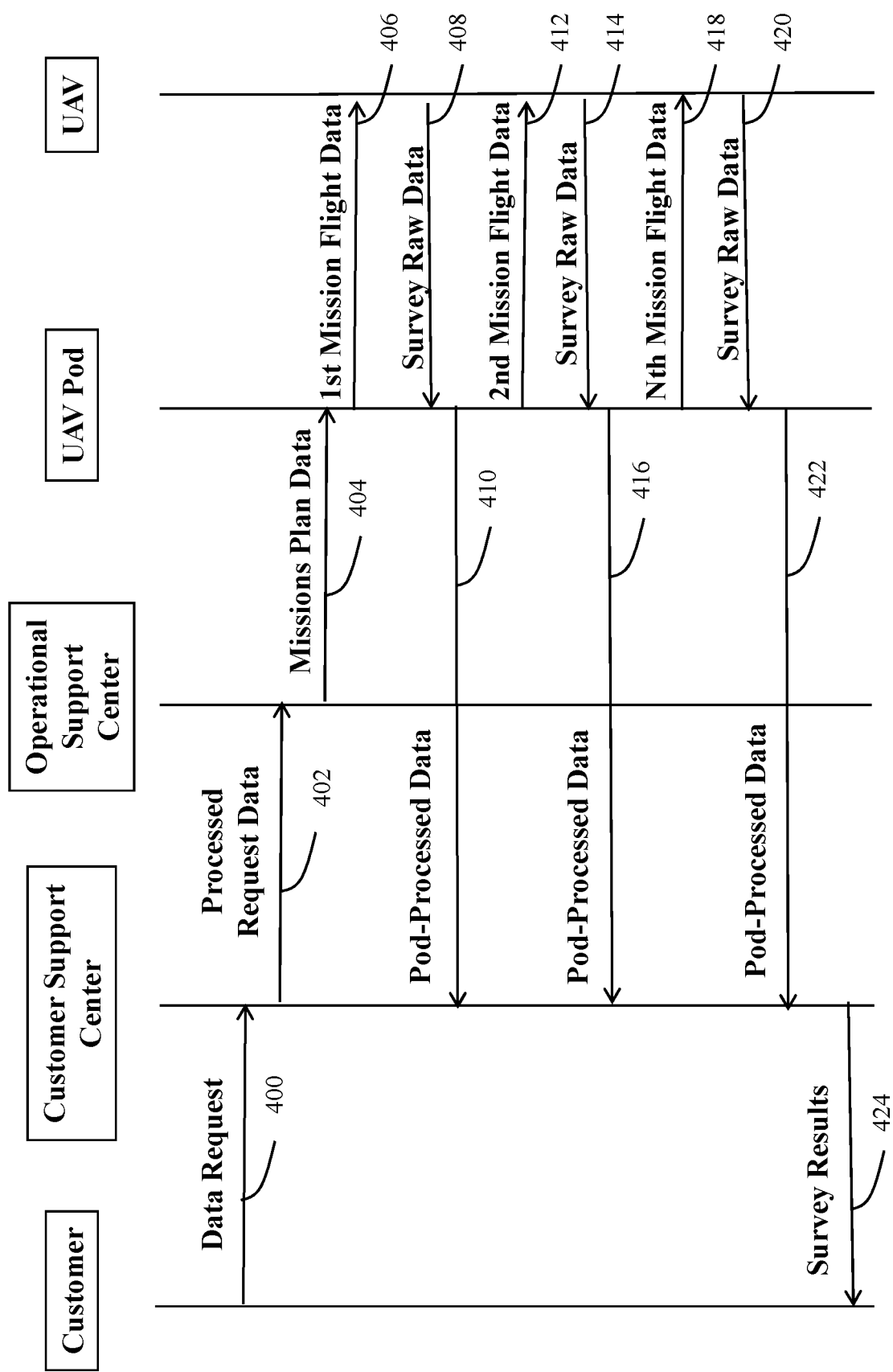
FIG. 4 is a data flow diagram illustrating information flow from a customer requesting data to a customer support center, an operational support center, a UAV in a UAV pod, and back again.

FIG. 4 is a data flow diagram illustrating information flow from a customer requesting data to a customer support center, an operational support center, a UAV in a UAV pod, and back again. A customer may submit a data request 400, such as a request for a geographic aerial survey, to a customer support center. The customer support center may work with the customer and the received data to finalize the data request for transmission 402 to an operational support center. The operational support center may use the finalized data request to determine the location of a launch site in or adjacent to a UAV pod survey site, to plan a plurality of flight missions that collectively accomplish the customer's geographic survey data request. The resultant missions plan data may then be provided 404 to a UAV pod that may be deployed to the launch site. Prior to launch, the first of the plurality of missions is provided to the UAV 406 in the form of flight data, such as altitude, heading, and way points, and the UAV is launched to perform the mission. Upon return of the UAV to the UAV pod, the survey raw data, such as camera imagery, event logs, GPS and IMU raw data, may be provided 408 to the UAV pod. In one embodiment, the UAV pod may pre-process the data, such as by converting the raw data into viewable JPGs with an accompanying geospatial location. Additional pre-processing may be performed, such as stitching the images into an orthomosaic. In a further embodiment, such pre-processing may be performed onboard the UAV prior to providing the data to the UAV pod. The pre-processed data may be provided 410 to the customer support center for final processing.

The next mission's flight data may be provided 412 to the UAV and the UAV may be launched to perform the next survey mission. Upon its return, the survey raw data may be provided 414 to the UAV pod for pre-processing and the pre-processed data may then be provided 416 to the customer support center for additional processing. With the UAV receiving the last mission flight data 418 and upon receipt by the UAV pod of the final survey raw data 420, the final pod-processed data may be provided 422 to the customer support center. After final processing of the collective missions pre-processed data, the survey results may be provided 424 by the customer support center to the customer.

Figure 5:
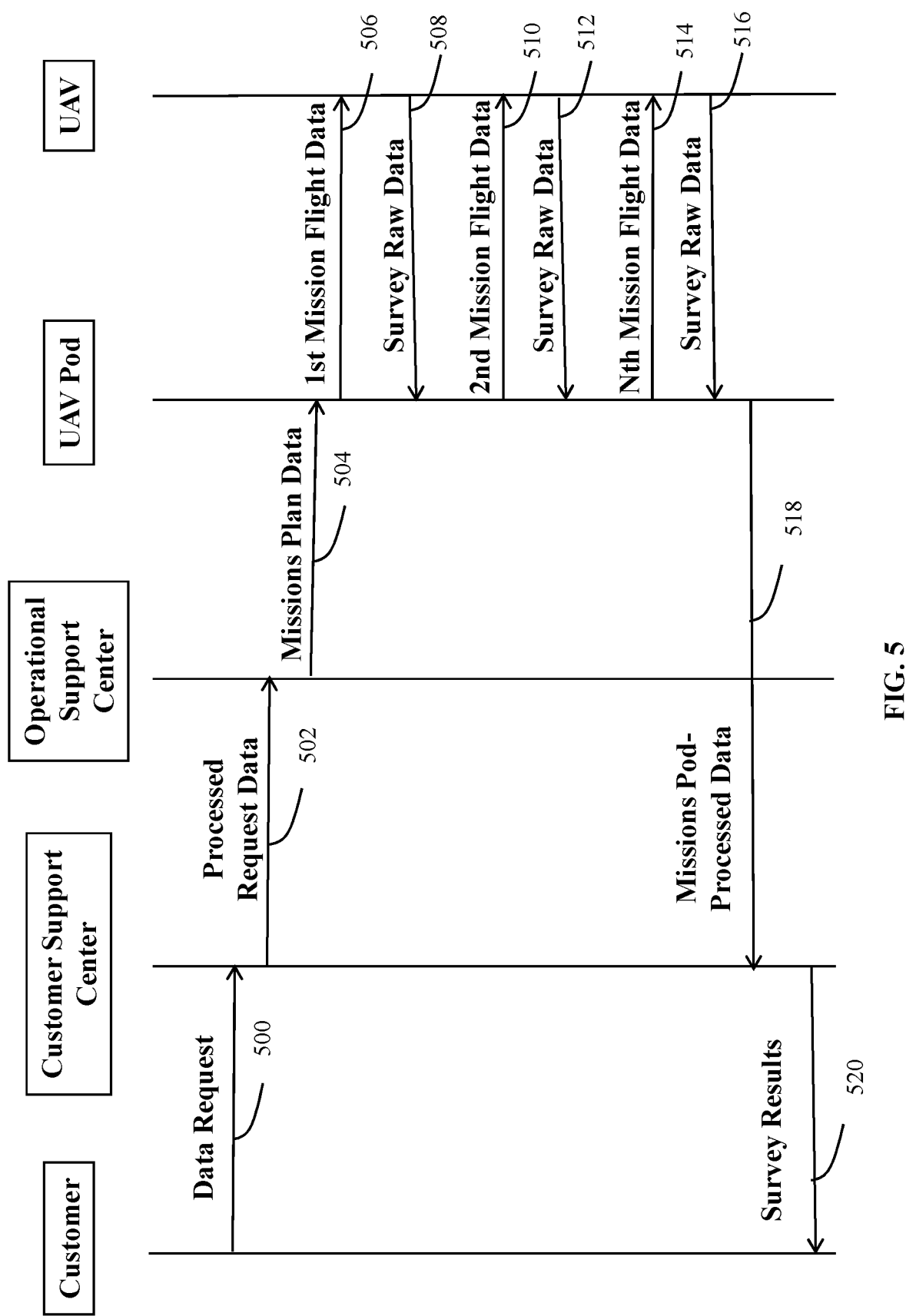
FIG. 5 is a data flow diagram illustrating another embodiment of the flow of information from a customer requesting data, to a customer support center, to an operational support center, to a UAV in a UAV pod, and back again to the customer.

FIG. 5 is a data flow diagram illustrating another embodiment of the flow of information from a customer requesting data, to a customer support center, to an operational support center, to a UAV in a UAV pod, and back again to the customer. As illustrated above, the customer may submit the data request 500 to the customer support center that may then finalize the data request for transmission 502 to an operational support center. The processed requested data is used to develop a plurality of flight missions that collectively accomplish the customer's data request. The resultant missions plan data may then be provided 504 to the UAV pod that may be deployed to the launch site, and the first mission's flight data may be provided 506 to the UAV prior to launch and accomplishment of the first flight survey mission. The pre-processed survey data may be provided 508 to the UAV pod for storage, and the second mission's flight data provided 510 to the UAV to conduct the second mission's survey. Upon returning to the UAV pod, the second mission's pre-processed flight data may be provided 512 to the UAV pod. After the last mission's flight data is provided 514 to the UAV by the UAV pod and after conclusion of the last flight mission survey, the last mission's flight survey data may be provided 516 to the UAV pod and the collective missions' pod-processed survey data provided 518 to the customer support center for final processing before providing 520 the finally-processed survey data to the customer.

Figure 6:
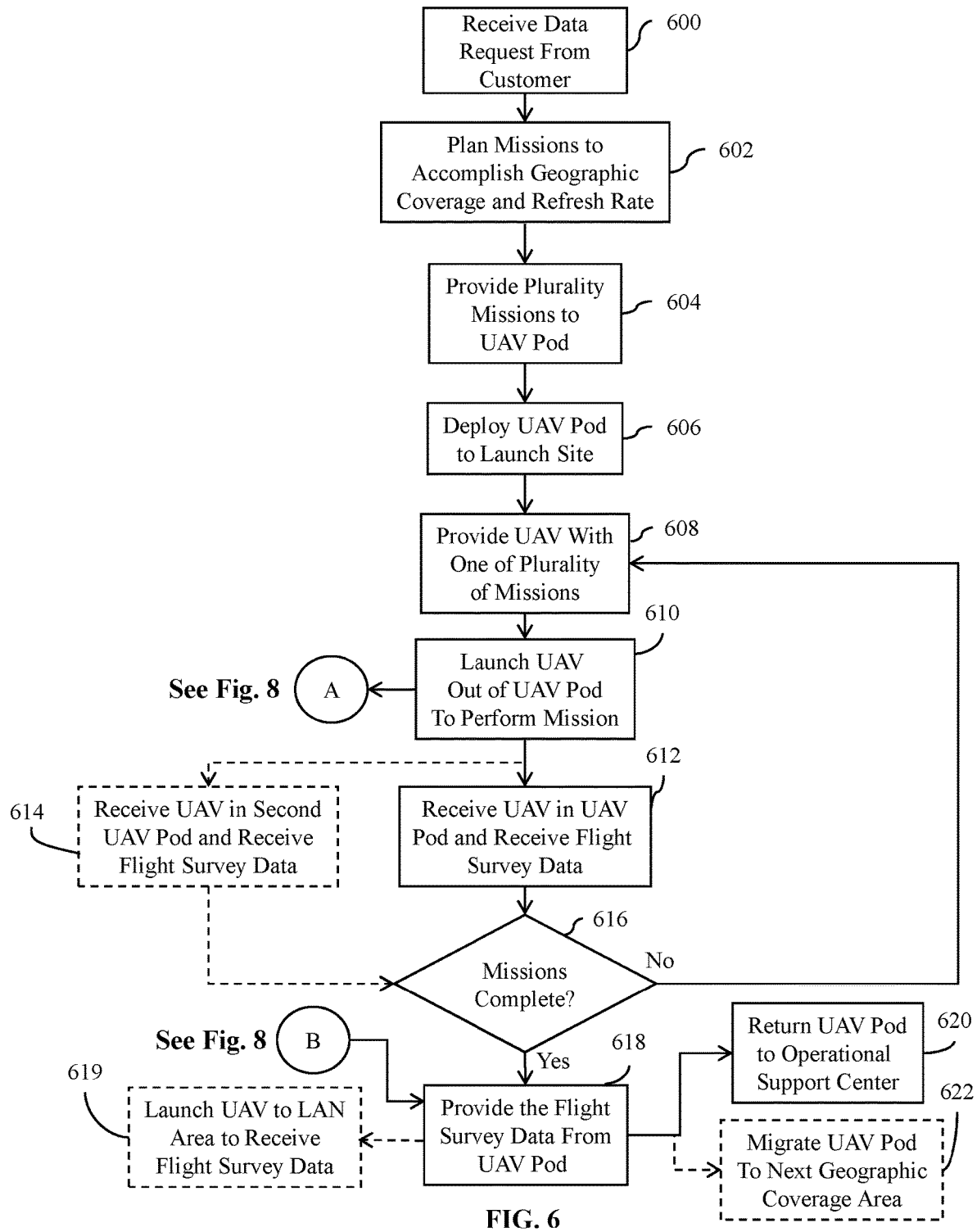
FIG. 6 is a flow diagram illustrating a more particular embodiment of use of the UAV pod and UAV system by a customer.

FIG. 6 is a flow diagram illustrating a more particular embodiment of use of the UAV pod and UAV system by a customer. A first data request is received from a customer, such as an owner of an agricultural field or land use manager (block 600). The customer may input the data request through a website portal that requests information detailing the request. For example, the customer may wish to provide geographic boundaries to survey a first geographic coverage area during a specific period of time to accomplish a refresh rate. "Refresh rate" refers to the number of times each area of the geographic coverage area is imaged during the deployment period for that geographic coverage area. In other embodiments, the data request may include a ground resolution or ground surface distance ("GSD"). For example, a GSD of one inch may enable the coverage areas and refresh rates described in Table 1.

TABLE 1

|  | Example 1 | Example 2 | Example 3 |
| --- | --- | --- | --- |
| UAV Deployment Period | 90 days | 90 days | 90 days |
| UAV Missions | 360 | 360 | 360 |
| GSD | 1 inch | 1 inch | 1 inch |
| Coverage Area | 100,000 | 12,500 | 6,250 |
| Refresh Rate | 1 (once / 90 days) | 8 (once / 11 days) | 16 (once / 6 days) |

Similarly, by suitably modifying GDS values, the UAV may have the coverage area and refresh rates listed in Table 2.

TABLE 2

|  | Example 4 | Example 5 | Example 6 | Example 7 |
| --- | --- | --- | --- | --- |
| UAV Deployment Period | 90 days | 90 days | 90 days | 90 days |
| UAV Missions | 360 | 360 | 360 | 360 |

TABLE 2-continued

|  | Example 4 | Example 5 | Example 6 | Example 7 |
|---|---|---|---|---|
| GSD | 2 inch | 4 inch | 0.5 inch | 0.25 inch |
| Coverage Area (acres) | 100,000 | 12,500 | 50,000 | 25,000 |
| Refresh Rate | 2 (once / 45 days) | 4 (once / 23 days) | 1 (once / 90 days) | 1 (once / 90 days) |

In other embodiments, rather than inputting the data request through a website portal, the customer may provide the data through a proprietary software interface or via a telephone interview mechanism, each in communication with a customer support center. A plurality of flight missions may then be planned that collectively accomplish the customer's (block 602) request such as by pre-planning how many flights and from what general areas they need to operate. The planned flight missions, such flight missions including flight mission data representing takeoff day/time, waypoints, flight altitudes, flight speeds, and such, are provided to the UAV pod (block 604) for future communication to a UAV seated in the UAV pod.

The UAV pod may then be deployed to a launch site that is either within or adjacent to the customer—desired geographic coverage area (block 606). Deployment may consist of loading the UAV into a UAV pod and transporting both to the launch site by means of truck or aircraft transport. By way of further example, the UAV pod and enclosed UAV may be transported by a commercial carrier (e.g., FedEX, UPS, etc.) to a farm for offloading into a field, or by an oil and gas utility company to a location adjacent a transmission or pipeline that may be the subject of a visual survey. The UAV may be provided with flight mission data representing one of the plurality of missions (block 608) such as by short range wireless or wired communication within the UAV pod. As used herein, "short range" may be defined as a range having sufficient distance to communicate with the UAV throughout the UAV's maximum range of flight. The UAV may then be launched out of the UAV pod to perform the provided flight mission (block 610). As described herein, a "mission" or "flight mission" preferably encompasses one launch, survey flight, and landing, but may encompass more than one launch/flight/landing. The flight mission data may also include dynamic flight instructions, such as altering its trajectory, attitude or such as by dropping a payload if certain conditions exist, such as would be valuable in a search and rescue mission if the plan locates the sought after object or person.

After completion of the flight mission, or in response to a rerouting request received by the UAV, the UAV is received in the UAV pod and the flight survey data is provided to UAV pod memory (block 612). In an alternative embodiment, rather than returning to the original UAV pod, the UAV flies to and is received by a second UAV pod (block 614) (see also FIGS. 12A and 12B). Such an alternative embodiment may be utilized in order to transition the UAV into an adjacent geographic survey region for receipt of a new plurality of missions for a second geographic survey. Alternatively, such an embodiment may be used to provide for an extended geographic area survey, one that would ordinarily not be accomplished with a single UAV due to the UAVs inherent power/range limitation. If all missions in the plurality of missions have not yet been completed (block 616), then the next one of the plurality of missions is provided to the UAV (block 608) and the UAV is again launched out of the UAV pod autonomously (i.e., without human intervention) to perform the next survey flight mission and the UAV may return to the UAV pod after completing the flight mission and the recorded survey data provided to the UAV pod. Otherwise, if all missions are completed (block 616), then the completed flight survey data may be provided from the UAV pod (block 618). The survey data may be provided to UAV pod memory that is in the form of detachable memory in the UAV pod, such as SD cards, USB flash memory, or otherwise detachable and portable memory, to a UAV pod servicer, or may be provided wirelessly through a cell phone connection, WLAN or LAN connection, or satellite—enabled transceiver. In an alternative embodiment, the UAV is routed to a LAN area for the LAN to receive the flight survey data wirelessly during flight and before returning for landing in the UAV pod (block 619).

Figure 7:
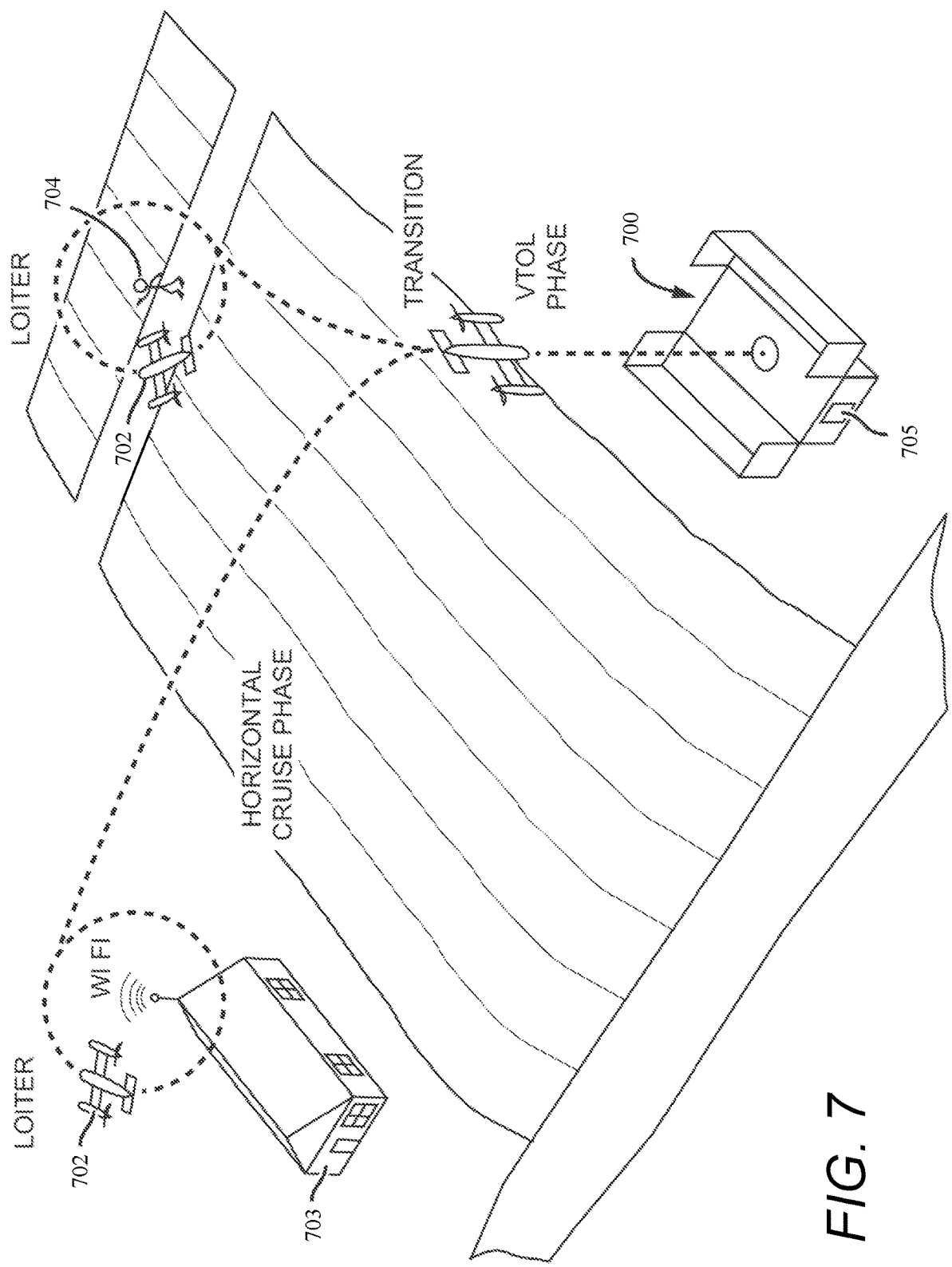
FIG. 7 shows a pod that due to its rural location lacks a wireless data connection and the UAV has flown from its pod to loiter above a house to be within range of the house's WiFi connection.

FIG. 7 shows a pod 700 that due to its rural location lacks a wireless data connection and the UAV 702 has flown from its pod 700 to loiter above a house 703 to be within range of the house's WiFi connection. This allows the UAV 702 to download data to either a server at the house 703 or to another location via an Internet connection. The UAV 702 can either store the data on board and then transmit it via the WiFi connection or relay a signal from the pod 700 to the WiFi.

FIG. 7 also shows that the UAV 702 could also transmit information by means of a physical act, such as loitering over an event of interest determined by the prior collection and processing of data. One example of such an event of interest could be the location of a lost person 704 or the location of an area of farmland that need additional water.

The flight survey data provided to UAV pod memory (perhaps detachable memory), provided wirelessly from the UAV pod, or even provided to a local LAN as described above, may be in raw or pre-processed form. For example, the flight survey data may simply be "zipped" and relayed to a remote processing station where all of the data is processed. Pre-processing the flight survey data prior to providing such from the UAV pod or directly from the UAV provides advantages. Data transmission bandwidth requirements may be reduced from what would otherwise be needed to transmit raw data for processing to an operational support center. A reduction in transmission bandwidth requirements may translate into reduced data transmission costs and time. In a preferred embodiment, either the UAV processor 208 (see FIG. 2) or UAV pod processor 114 (see FIG. 1) may pre-process the UAV-captured raw data (e.g., block 418, see FIG. 4). The UAV-captured raw data such as camera imagery, event logs, GPS and IMU raw data may be converted into viewable JPGs with accompanying geospatial location (i.e., "geo-tagging") for transmission. However, additional pre-processing may be performed either by the UAV processor or UAV pod processor. For example, the JPG images and accompanying geospatical location may be further processed to stitch the images into an orthomosaic so that what is sent from the UAV pod or from the UAV itself is a single high resolution image covering the entire flight survey area (or from an individual flight mission) resulting in the lowest bandwidth needed for transmission and the highest level of automation of pre-processing for the ultimate customer for measuring roads, buildings, fields, identifying agricultural progress, inspecting infrastructure, urban planning, and other analysis.

As shown in FIG. 7, the UAV pod 700 may include an interface and display 705 to provide the collected data and processed data for use at site without the need for transmission from the pod 700 to an offsite location. For example, the display 705 may be used to inform local users (e.g., farmhands) of areas that need additional watering or the like.

As shown in FIG. 6, the UAV pod (which may now include the UAV) may then be retrieved and returned to an operations support center (block 620). A second plurality of flight missions may then be uploaded into the UAV pod to accomplish a second data request from the same or a different customer and the UAV pod re-deployed. In an alternative embodiment, rather than returning the UAV pod to a support center, the UAV pod may be moved or migrated (block 622) to a second or next geographic coverage area for further use.

In a further alternative embodiment, the UAV pod may be deployed to a launch site prior to providing the UAV pod with flight missions data representing the planned flight missions. In such a scheme, the UAV pod may establish or join a local LAN connection for receipt of the planned flight missions on-site.

Local UAV Operation

Figure 8:
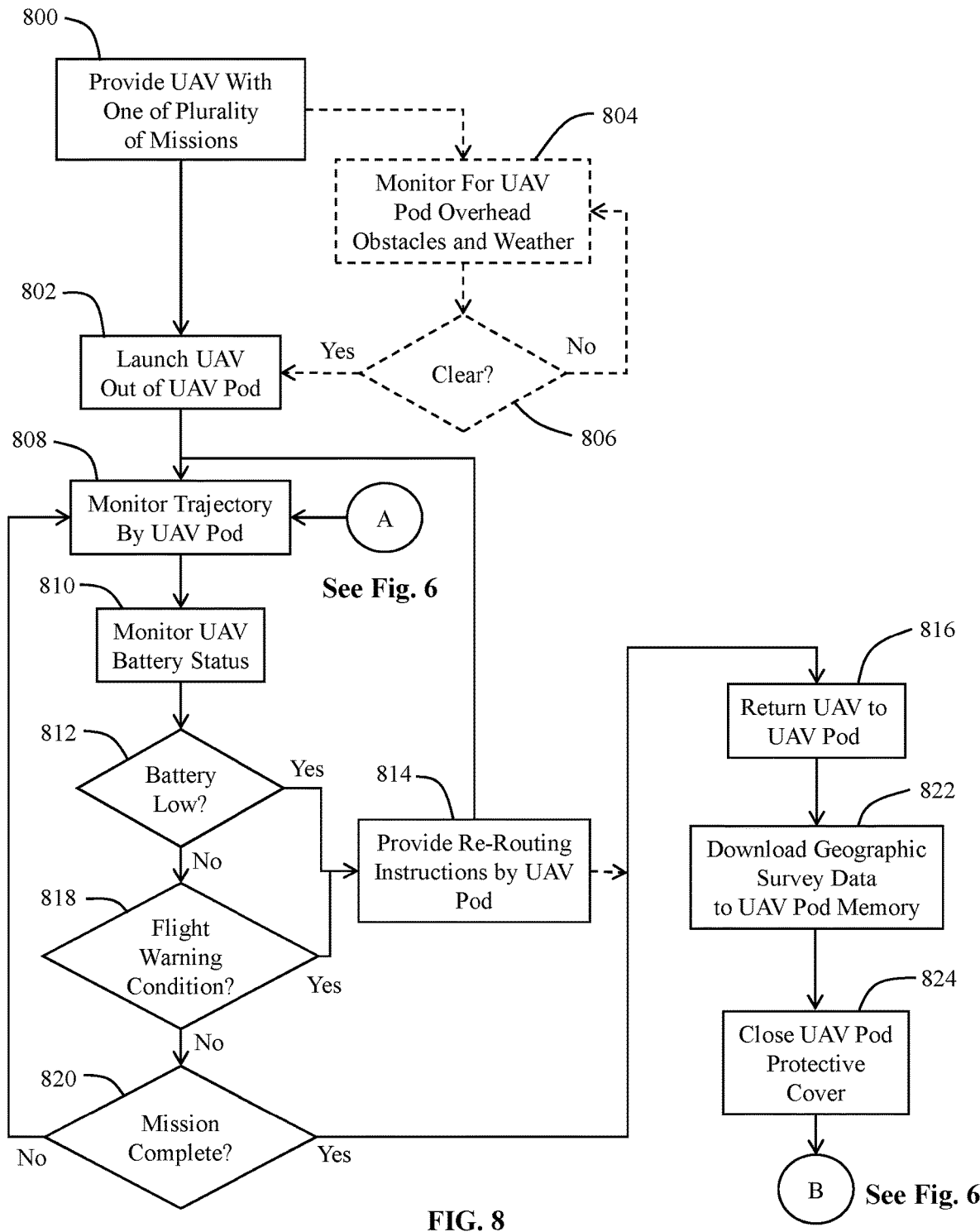
FIG. 8 is a flow diagram illustrating one embodiment of a method of conducting flight missions for the UAV.

FIG. 8 is a flow diagram illustrating one embodiment of a method of conducting flight missions for the UAV. The UAV may be provided with one of the plurality of missions (block 800) that reside in the UAV pod. The UAV may be launched vertically out of the UAV pod (block 802), preferably under its own power using the two rotors on the UAV. In one embodiment, the immediate environment over the UAV pod is monitored for obstacles and weather (block 804) that may otherwise interfere with launch of the UAV. In such an embodiment, if no obstructions are detected (block 806), then the UAV may be launched out of the UAV pod (block 802). Otherwise, launch of the UAV is delayed or cancelled and the UAV pod continues to monitor for overhead obstacles and weather (block 804, 806), as well as the UAV battery status (block 810). After launch, the UAV pod may monitor the UAV's trajectory (block 808). If UAV battery power is low or otherwise drops below a predetermined voltage threshold (block 812), then the UAV pod may provide rerouting instructions to the UAV (block 814) to shorten the current mission to enable a safe return of the UAV to the UAV pod. In an alternative embodiment, the UAV is directed to return immediately to the UAV pod (block 816) or to an intermediate pre-determined position. If, however, the battery is not low (block 812), and no other flight warning condition is triggered (block 818) the mission continues (block 820). If the current UAV mission has been completed (block 820), the UAV returns to the UAV pod (block 816) for landing and the geographic survey data is downloaded to the UAV pod memory (block 822) such as by a wireless or wired transfer of the mission data to the UAV pod memory. The UAV pod protective cover may be closed (block 824) to protect the UAV from the external environment (i.e., rain, direct sun, vandals, or damaging particulate matter).

Methods of General Survey Use—Contiguous Survey Areas

Figure 9:
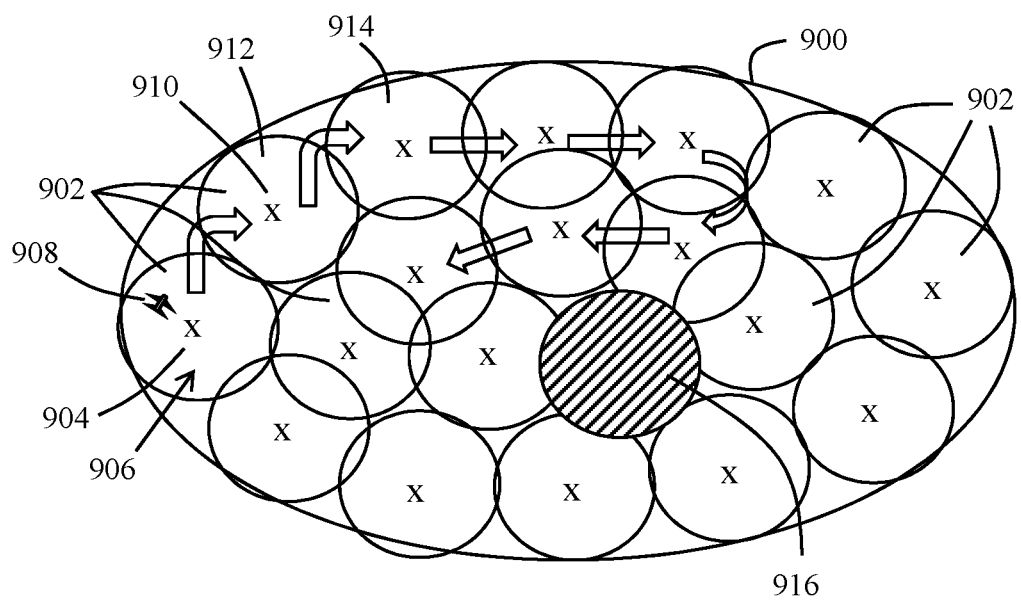
FIG. 9 is a block diagram illustrating the use of a plurality of UAV pods with only one UAV to extend the possible geographic survey area from what would otherwise exist with only one UAV.

While embodiments of the system thus far are described within the context of a flight survey using only one UAV pod, it is contemplated that a customer of the system may request a geographic coverage area that extends beyond the capabilities of a single UAV and UAV pod combination. FIG. 9 is a block diagram illustrating the use of a plurality of UAV pods with only one UAV to extend the possible geographic survey area from what would otherwise exist with only one UAV. An operator of the system may review the customer request and allocate n number of UAV pods for deployment at a given UAV pod spacing. An extended geographic survey area 900 may thus be divided into a plurality of individual geographic survey areas 902 for mission planning purposes. A respective plurality of UAV pods (each indicated by an 'X') may be deployed in predetermined launch locations so as to substantially cover the extended geographic survey area 900 and a communication network established to allow a single human manager to monitor the setup of the entire network of UAV pods. The size of each coverage or survey area 902 and the positioning of the pods across the area 900, may vary by a variety of factors including the range, flight time, recharge time, sensor or sensors of the UAV to be employed in that area 902, the frequency of the survey, the weather or season (as they may affect performance of the UAV and/or the charging capabilities of the pod), obstacles and obstructions, wireless communications between the pod and either the UAV, other pods, cellular network, or other radio system, dispersion of other pods in adjacent areas, and the like. The positioning of the pods may also be affected by the ability to position or deliver the pods to desired locations given the accessibility provided by local roads and terrain. A UAV pod 904 having a pre-loaded UAV may be deployed having a plurality of preloaded missions that are collectively sufficient to survey the immediately—surrounding coverage area 906. After the UAV has autonomously completed the missions to survey the immediately—surrounding coverage area 906, the UAV 908 may be transitioned to the next predetermined UAV pod 910 for recharging (or refueling) and to receive the first of a next plurality of flight missions to cover the second immediately—surrounding coverage area 912. Through the use of a plurality of missions designed specifically to collectively cover the second coverage area 912, the UAV may then migrate to the next coverage area 914 and so on until the entire extended coverage area 900 has been surveyed. In one embodiment, a non-coverage area 916, such as a lake, mountain, forest, city, non-farm land, or other area that is not of interest, is included in the extended coverage area 900 and may be avoided from survey activities to possibly extend the serviceable area for the UAV.

In an alternative embodiment that recognizes the autonomous landing capability of the UAV, the UAV, rather than transitioning to the next individual geographic survey area 902 or to the next individual geographic survey areas 902, the UAV may fly to a predetermined data offloading waypoint, such as a customer's farm house or automobile, to establish or join a local LAN connection or to establish a wireless connection to provide a data dump of geographic survey data.

In a further alternative embodiment, more than one UAV may be provided within the extended geographic survey area 900, with each UAV having a different sensor suite to gather complementary data for the customer. In such a scheme, each UAV may survey the entire extended geographic survey area 900 by transitioning through the plurality of individual geographic survey areas 902 over time, or to only a subset of each area 900, to obtain a more complete understanding of the area 900 than would be possible with only a single UAV sensor suite.

Figure 12B:
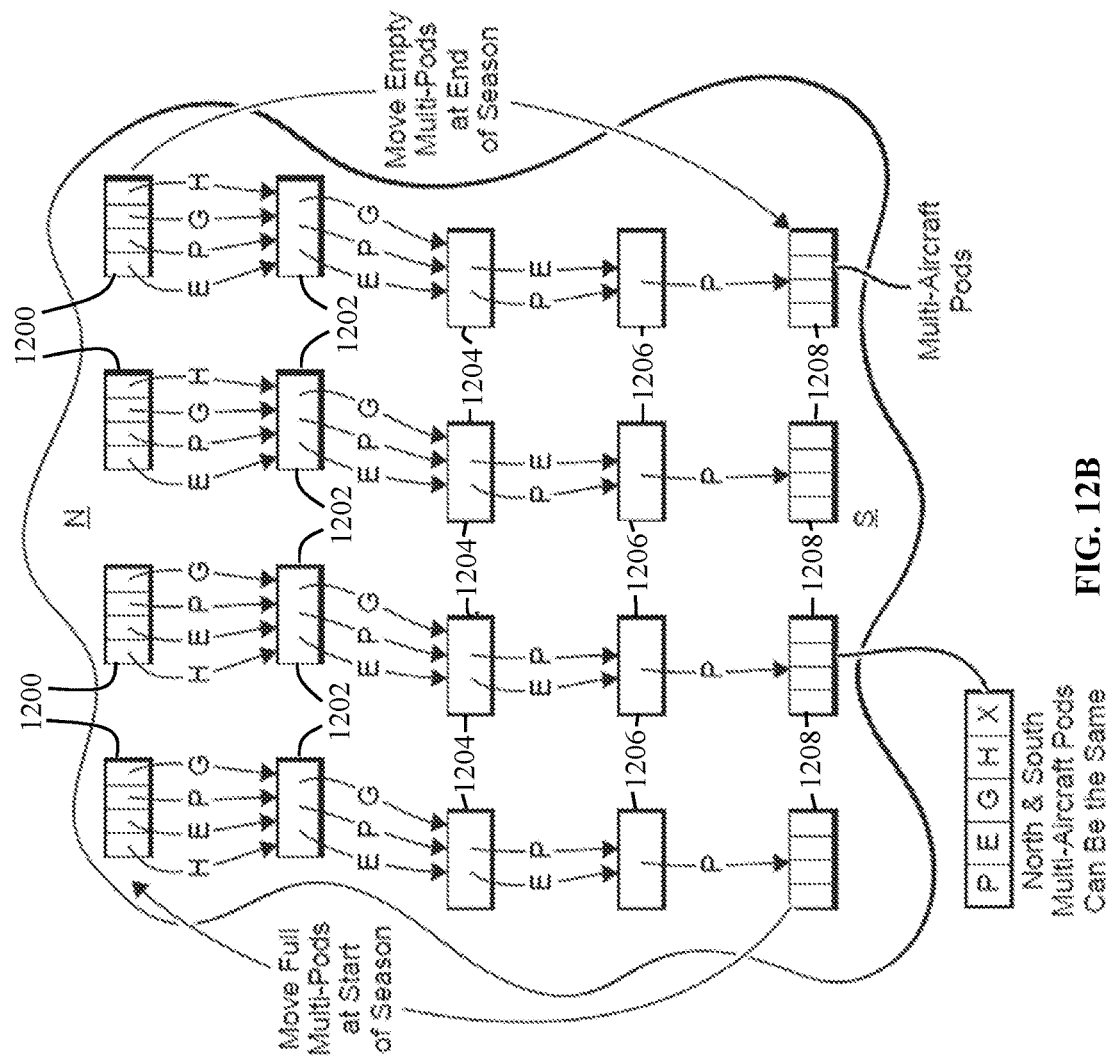
FIGS. 12A and 12B depict several weeks of a UAV migration flow plan that uses multi-aircraft UAV pods to initiate UAV surveys across four disparate North-South geographic areas that have pre-positioned single-UAV pods for receipt and provisioning of the migrating survey UAVs.

Also, although the prior description describes one UAV for each UAV pod, in an alternative embodiment, each UAV pod may selectively encompass, provide power for, and distribute missions to two or more VTOL UAVs (see FIG. 12B). In some embodiments, each pod deployed to a survey area 902 will include its own UAV to allow the given area 902 to be surveyed at the same time, or about the same, time or frequency as any other area 902. UAV pods in different areas 902 could contain UAVs with different sensors, or sensor suites, and the UAV pods could trade UAVs as necessary to obtain the desired sensor coverage.

Figure 10:
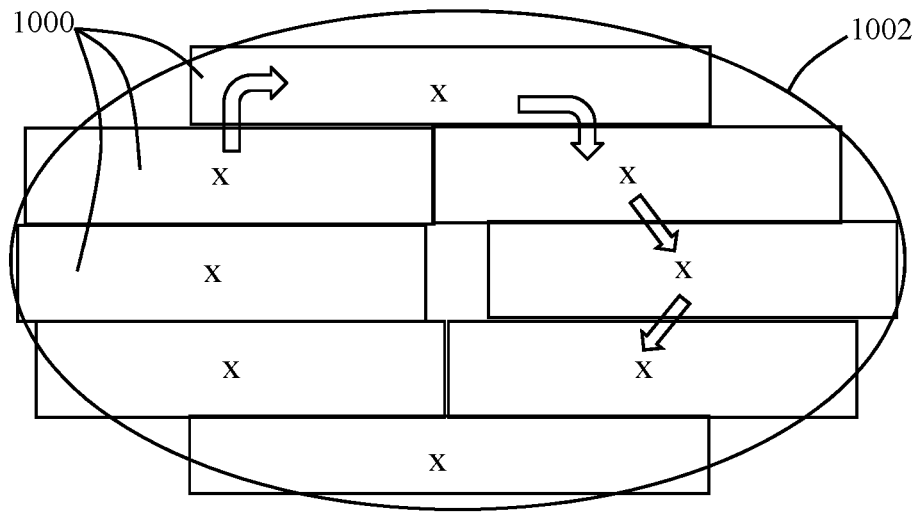
FIG. 10 depicts a UAV pod and associated UAV that may be provided with a plurality of missions that cover a rectangular coverage area.

Although FIG. 9 illustrates each immediately—surrounding coverage area (e.g., 906, 912, 914) as being circular, a UAV pod and associated UAV may be provided with a plurality of missions that cover a rectangular coverage area 1000 (see FIG. 10) or a coverage area having different regular or irregular shapes to accomplish the overall goal of surveying an extended coverage area 1002 that could not otherwise be covered without the use of multiple UAVs or with UAVs having significantly greater range capabilities, as illustrated in FIG. 10.

Methods of General Survey Use—Non-Contiguous Survey Areas

Figure 11:
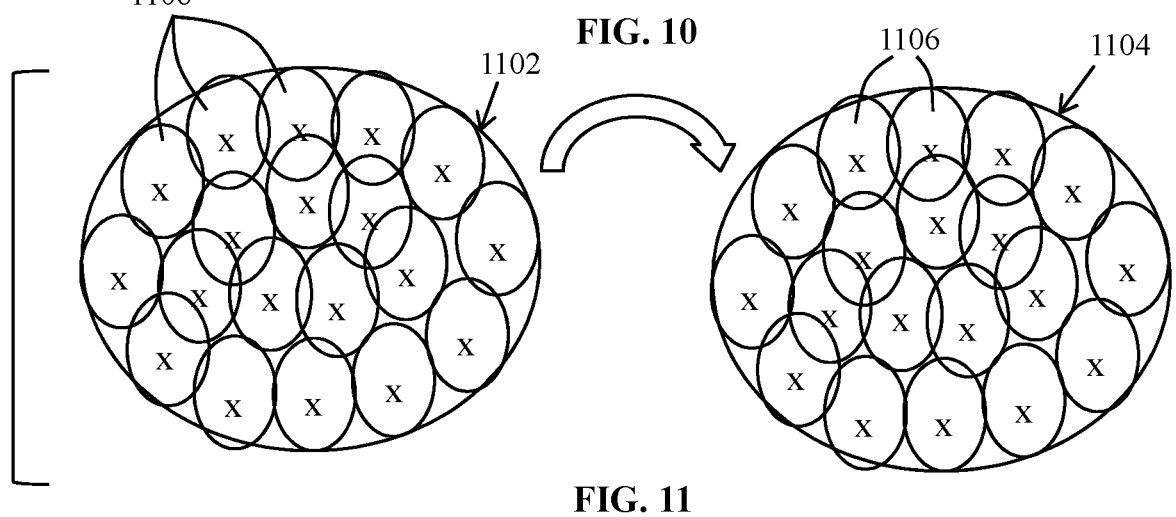
FIG. 11 illustrates two extended coverage survey areas that may be serviced using only one UAV or a limited number of UAVs.

FIG. 11 illustrates two extended coverage survey areas that may be serviced using only one UAV or a limited number of UAVs. The two extended coverage survey areas (1102, 1104) are not contiguous, but rather are separated into two distinct extended coverage areas. During a mission planning procedure, each of the two extended coverage survey areas (1102, 1104) are broken up into perspective area sets 1106 that are serviceable with a single UAV/UAV pod set. In such an arrangement, a single UAV may transition from one area set 1106 to the next within the first extended coverage survey area 1102 as the respective missions are completed, until transitioning to the next extended coverage survey area 1104.

Methods of Agricultural Survey Use—Non-Contiguous Areas ("UAV Migration")

Figure 12A:
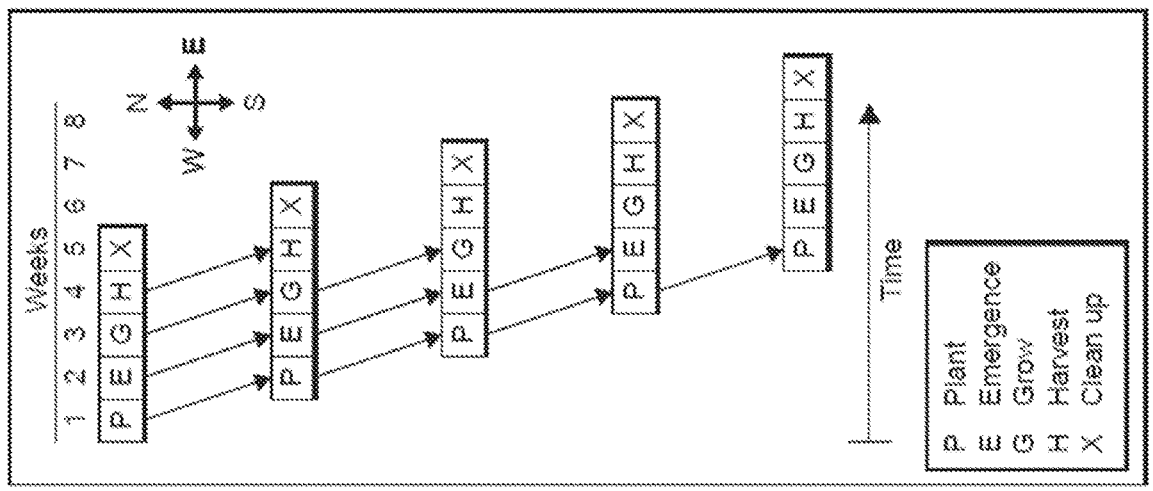

FIGS. 12A and 12B depict several weeks of a UAV migration flow plan that uses multi-aircraft UAV pods to initiate UAV surveys across four disparate North-South geographic areas that have pre-positioned single-UAV pods for receipt and provisioning of the migrating survey UAVs. In one survey embodiment, the survey captures planting (P), emergence (E), growth (G), harvest (H) and clean-up (X) time phases of each agricultural field's growing season using pre-determined UAV sensors. Each UAV in the multi-aircraft UAV pods may have a different sensor payload, such as some combination of infra-red (IR), Lidar, Radar, or optical cameras for each UAV to accomplish a specific survey task, thus reducing payload weight and maximizing duration and range for each individual UAV. For example, since a Lidar sensor is needed to check crop height, a Lidar-equipped UAV would not be appropriate for use during the planting phase but would provide useful data during the growth phase.

In week 1, a first of five UAVs in each multi-aircraft UAV pod 1200, the first UAVs referred to for convenience as the "planting UAVs" because of provisioned sensors for detecting the success of the targeted crop's planting phase, may survey the first local geographic survey area to assess and/or record the success or failure of the survey area's planting (P) period. After the conclusion of the planting geographic survey, the planting UAVs may be flown (i.e., "migrated") (indicated by arrows), preferably autonomously, to the adjacent second region single UAV pod 1202 survey site for subsequent provisioning, such as battery charging, in preparation for the next survey.

In week two, the planting UAVs may be again launched, this time from the second region UAV pod 1202 survey site, to conduct flight surveys to assess and/or record the area's planting (P) phase. In addition, a second of five UAVs in the multi-aircraft UAV pods 1200, referred to for convenience as the "emergence UAVs" because of provisioned sensors for detecting the success of the targeted crop's emergence phase, are launched for the first time to capture the emergence (E) phase of first geographic survey area that was previously surveyed during its planting phase. After the conclusion of the planting and emergence phase surveys by the planting and emergence UAVs, respectively, the UAVs may be flown (indicated by arrows), preferably autonomously, to the adjacent second and third regions UAV pods (1202, 1204) survey sites, respectively, for subsequent provisioning, such as battery charging, in preparation for the next survey.

In week three, the planting UAVs may again be launched, this time from the third region UAV pod 1204 survey sites, to conduct flight surveys to assess and/or record the area's planting (P) phase. The emergence UAVs may initiate their second survey, this time from the second region UAV pod 1202 survey sites, to conduct flight surveys to assess and/or record the area's emergence (E) phase. In addition, a third of five UAVs in the multi-aircraft UAV pods 1200, referred to for convenience as the "growth UAVs" because of provisioned sensors for detecting the success of the targeted crop's growth phase, are launched for the first time to capture the growth (G) phase of first geographic survey area that was previously surveyed during both their planting and emergence phases. After the conclusion of the planting, emergence, and growth phase surveys by the planting, emergence, and growth UAVs, respectively, the UAVs may be flown (indicated by arrows), preferably autonomously, to the adjacent second, third, and fourth region UAV pods (1202, 1204, 1206) survey sites, respectively, for subsequent provisioning, such as battery charging, in preparation for the next survey.

In week four, the planting UAVs may be launched to initiate their fourth survey, this time from the fourth region UAV pod 1206 survey sites, to conduct flight surveys to assess and/or record the local area's planting (P) phase. The emergence and growth UAVs may also be launched to initiate their surveys, this time from the third and second region UAV pod (1204, 1202) survey sites, respectively. In addition, a fourth of five UAVs in the multi-aircraft UAV pods 1200, referred to for convenience as the "harvest UAVs" because of provisioned sensors for detecting the success of the targeted crop's harvesting phase, are launched for the first time to capture the harvesting (H) phase of the first geographic survey area that was previously surveyed during their planting, emergence, and growth phases by the planting, emergence, and growth UAVs, respectively. After the conclusion of the planting, emergence, growth, and harvest phase surveys by the planting, emergence, growth, and harvesting UAVs, respectively, the UAVs (not shown) may be flown (indicated by arrows), preferably autonomously, to their next-scheduled survey sites.

In week five, the planting UAVs may be launched to initiate their fifth survey, this time from the fifth region multi-aircraft UAV pod 1208 survey sites, to conduct flight surveys to assess and/or record the local area's planting (P) phase. The emergence, growth, and harvest UAVs may also be launched to initiate their respective surveys, this time from the fourth, third, and second region UAV pods (1206, 1204, 1202) survey sites, respectively. Lastly, a fifth of five UAVs in the multi-aircraft UAV pods 1200, referred to for convenience as the "cleanup UAVs" because of provisioned sensors for detecting the success of the targeted fields' cleanup phase, are launched for the first time to capture the cleanup (X) phase of the first geographic survey area that was previously surveyed during their planting, emergence, growth, and harvesting phases.

Although not illustrated, in one embodiment, the remainder of weeks 6-9 would be used to accomplish the remaining emergence, growth, harvesting, and cleanup phase surveys of each of the geographic survey areas as the individual UAVs migrated from the northern-most multi-aircraft UAV pods 1200 down through the individual UAV pods (1202, 1204, 1206) and finally to the southern-most multi-aircraft UAV pods 1208 where the finally-enclosed UAVs would be made available for physical pick-up. In one embodiment, the northern-most and southern-most multi-aircraft UAV pods are the same pods, with launch and landing of the first and fifth UAVs coordinated to allow migration of the multi-aircraft pods 1200 to the southern-most pod position illustrated in FIG. 12B.

In alternative embodiments, the UAVs may be migrated in compass orientation other than generally North-South, or in migration paths that are not generally linear or in a manner that is not dependent on clearly defined crop phases.

Figure 13:
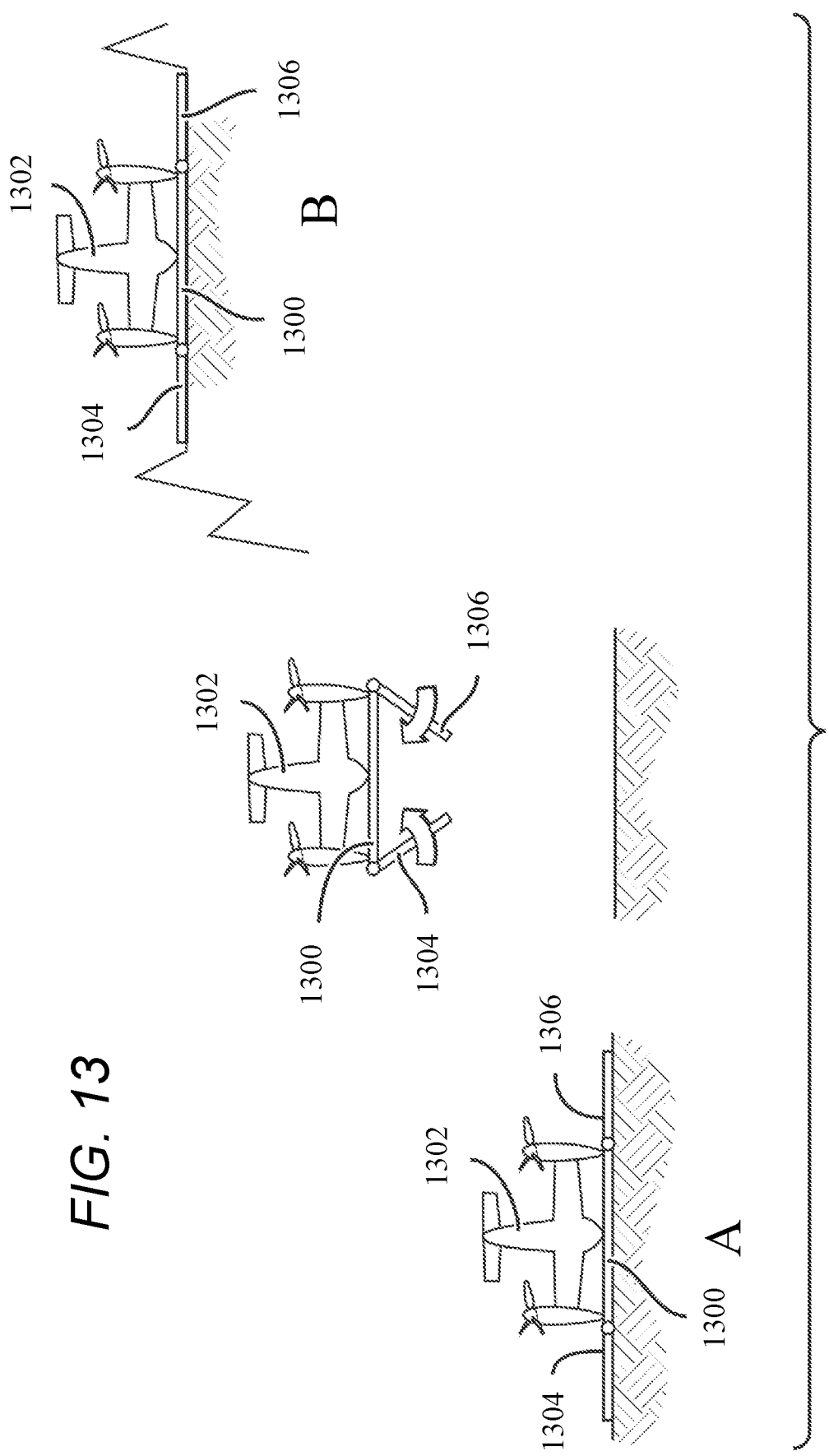
FIG. 13 depicts a system that may include a portable UAV pod that can be relocated and positioned by the UAV carrying it.

As shown in FIG. 13, in embodiments, the system may include a portable UAV pod 1300 that can be relocated and positioned by the UAV 1302 carrying it. The UAV pod 1300 is generally lighter and smaller than other UAV pods set forth herein so as to allow it to be carried by the UAV 1302. The weight and size of the pod 1300 could be reduced by any of a variety of means including having it lack doors to enclose the UAV 1302. Such a pod 1300 could be used as a way station for the UAV 1302 to stop at to recharge and extend its overall range. Also, by having the UAV pod 1300 being able to be positioned by the UAV 1302 would allow the pod 1300 to be placed in otherwise effectively inaccessible locations, such as on top of a mountain or on an island. As shown in FIG. 13, the UAV 1302 starts on the pod 1300 in location A, where the UAV 1302 is physically attached to the pod 1300. Then the UAV 1302 takes off vertically with the pod 1300 to deliver it to a remote location B, at which the UAV 1302 can detach from the pod 1300 and leave it in place. To aid in its transport the UAV pod 1300 may have portions 1304 and 1306 that can fold up during transport and unfold prior to landing at the new location. The folding portions 1304 and 1306 could be solar panels to collect and power the pod 1300 and the UAV 1302. Positioning pods 1300 in this manner would allow for a tailoring of the geographic area that the UAV could cover. Such lighter less capable pods 1300 could work in conjunction with more functional fix position pods, such as those set forth herein as the pods 1300 would provide less functions (e.g., charging only) than the fixed pods (e.g., charging, data processing, data transmission, an enclosure for UAV protection, etc.).

Figure 14A:
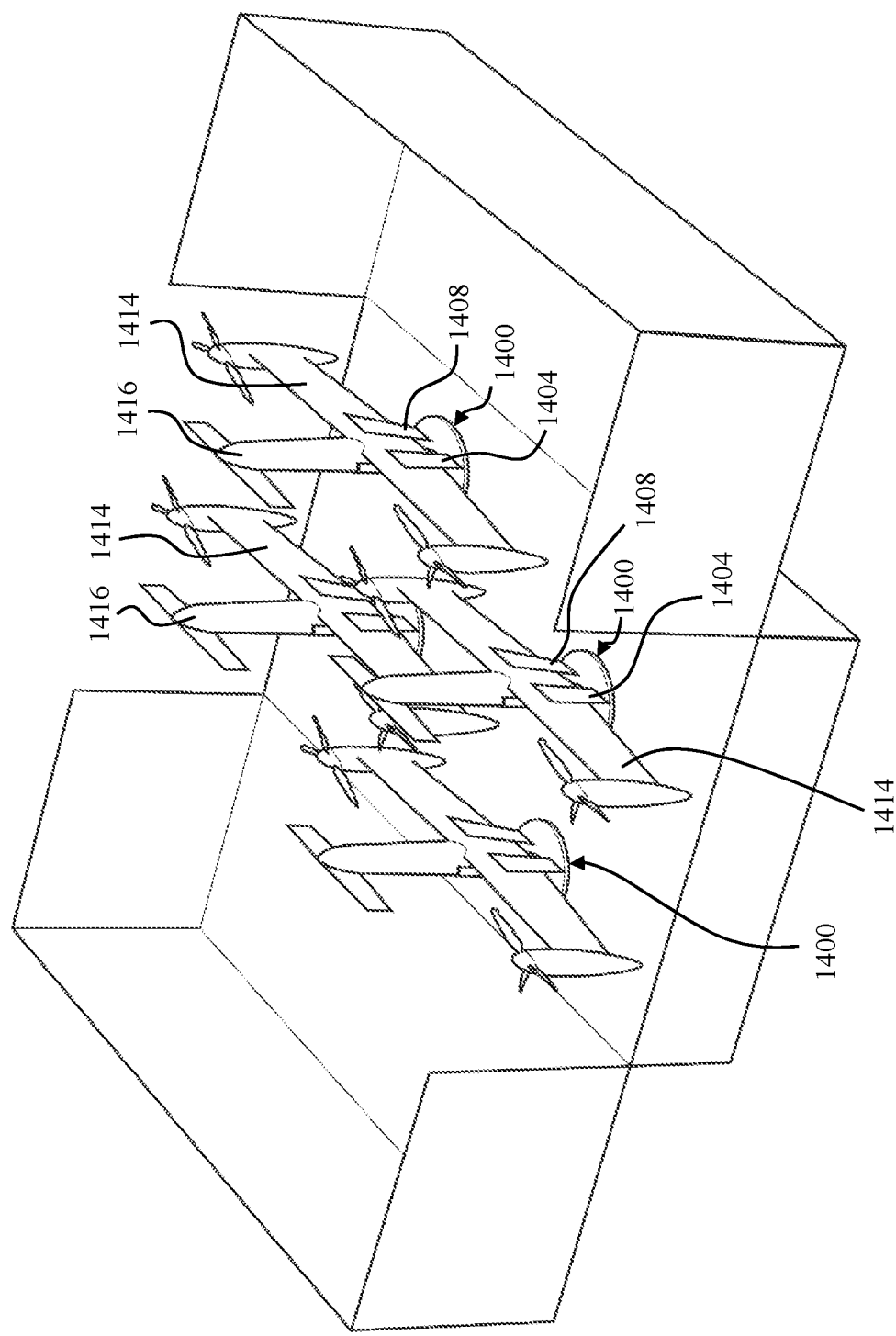
FIGS. 14A and 14B illustrate one embodiment of a UAV pod that is capable of use with more than one UAV.
Figure 14B:
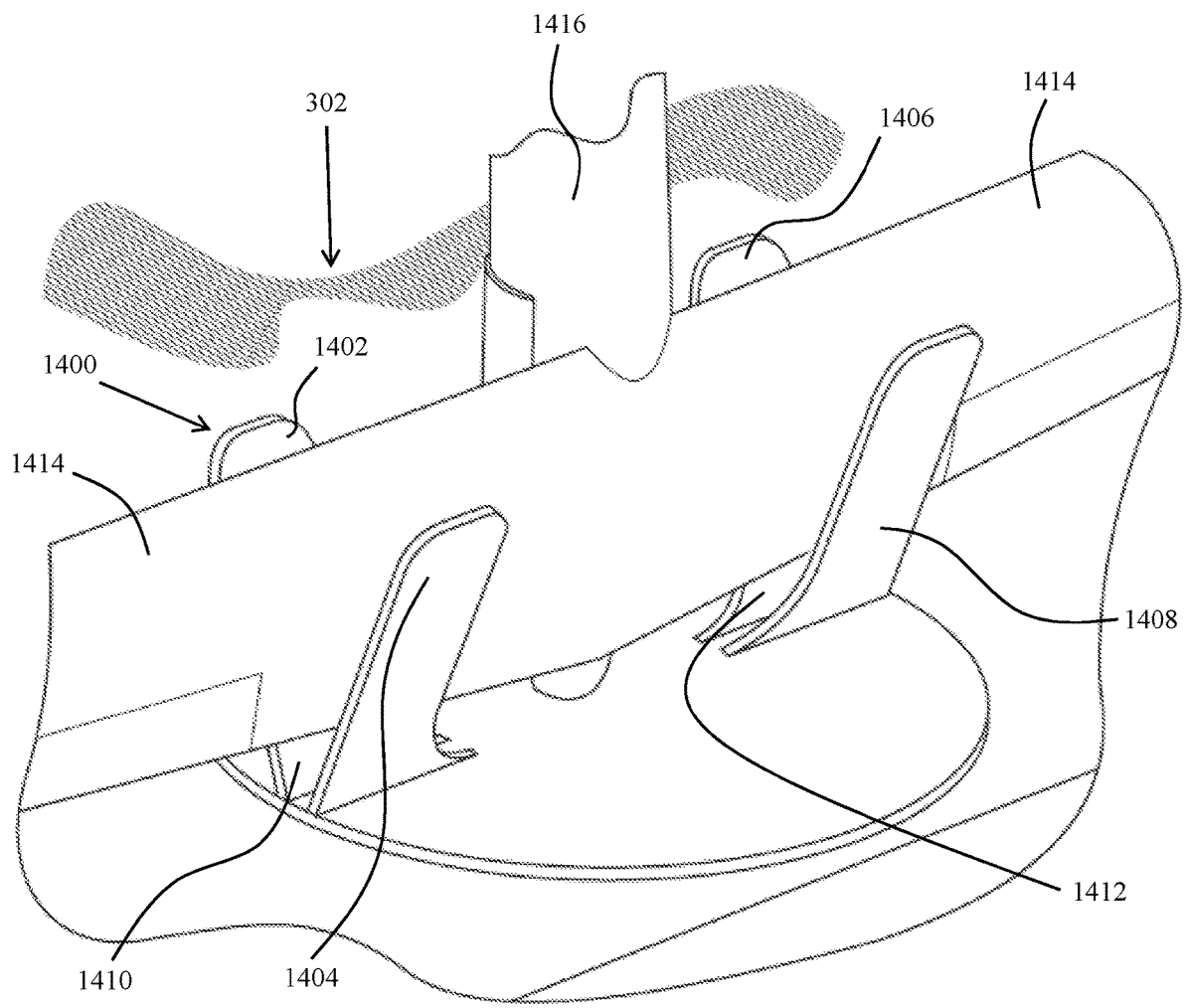

FIGS. 14A and 14B illustrates one embodiment of a multi-aircraft UAV pod for use with a plurality of UAVs, such as may be used to accomplish a UAV migration flow plan. A plurality of landing mechanisms 1400 may have two pairs of opposing guides such as guide paddles (1402, 1404, 1406, 1408). Each pair of guide paddles (1402, 1404)(1406, 1408) form a V-channel (1410, 1412) that serve to guide the wings 1414 of the UAV 1416 into a proper angular orientation with respect to the UAV hinged cover 302 to allow the hinged cover to close to selectively encompass the UAV for protection from the external environment.

While various embodiments of the invention have been described, it will be apparent to those of ordinary skill in the art that many more embodiments and implementations are possible that are within the scope of this invention.

What is claimed is:

1. A method of migrating unmanned aerial vehicle (UAV) operations between geographic survey areas, comprising:
   receiving a first plurality of flight missions into a UAV for a first geographic survey area;
   deploying the UAV in the first geographic survey area;
   autonomously launching the UAV in the first geographic survey area a plurality of times to perform the first plurality of flight missions;
   determining completion of the first plurality of missions by the UAV;
   providing, based on the determined completion of the first plurality of missions, first survey data from the UAV; and
   autonomously migrating, based on the determined completion of the first plurality of missions, the UAV from the first geographic survey area to a second-geographic survey area, wherein the autonomous migrating of the UAV to accomplish the first survey data happens autonomously and without active human intervention.

2. The method of claim 1, wherein the first geographic survey area comprises at least one agricultural field in at least one crop phase.

3. The method of claim 2, wherein the crop phase is at least one of: a planting phase, an emergence phase, a growth phase, a harvest phase, and a clean-up phase.

4. The method of claim 3, wherein the provided first survey data relates to the at least one crop phase.

5. The method of claim 1, further comprising:
   receiving a second plurality of flight missions into the UAV;
   providing the UAV with one of the second plurality of flight missions;
   autonomously launching the UAV in the second geographic survey area a plurality of times to perform the second plurality of flight missions; and
   providing a second survey data from the UAV;
   wherein the autonomous migrating of the UAV to accomplish the first and second survey data happens autonomously and without active human intervention.

6. The method of claim 5, further comprising:
   performing data analysis of the first and second survey data; and
   providing the data analysis to a customer.

7. The method of claim 5, further comprising:
   storing the provided first survey data in a UAV memory in the first geographic survey area; and
   storing the provided second survey data in the UAV memory in the second geographic survey area.

8. The method of claim 5, further comprising:
   determining, by a first weather sensor in the first geographic survey area in communication with a processor of the UAV, a flight decision based on a measurement of the external environment prior to each autonomous launch of the UAV in the first geographic survey area;
   determining, by a second weather sensor in the second geographic survey area in communication with the processor of the UAV, a flight decision based on a measurement of the external environment prior to each autonomous launch of the UAV in the second geographic survey area;

autonomously landing the UAV in the first geographic survey area a plurality of times after each of the performed first plurality of flight missions;

autonomously landing the UAV in the second geographic survey area a plurality of times after each of the performed second plurality of flight missions; and autonomously routing the UAV to a local area network (LAN) for wireless transmission of at least one of: the first survey data and the second survey data by a transceiver of the UAV.

9. The method of claim 5, further comprising:

uploading a third plurality of flight missions into the first UAV pod;

autonomously launching a second UAV from the first geographic survey area a plurality of times to perform the third plurality of flight missions;

providing third survey data from the second UAV;

autonomously migrating the second UAV from the first geographic survey area to the second geographic survey area;

receiving a fourth plurality of flight missions in the second geographic survey area;

providing the second UAV with one of the fourth plurality of flight missions from the second geographic survey area;

autonomously launching the second UAV from the second geographic survey area a plurality of times to perform the fourth plurality of flight missions; and providing a fourth survey data from the second UAV;

wherein the autonomous migrating of the second UAV to accomplish the third and fourth survey data happens autonomously and without active human intervention.

10. The method of claim 1 further comprising:

processing, by a first processor of the first UAV, the provided first survey data, wherein the processing comprises at least one of: converting the provided first survey data into one or more viewable images with accompanying geospatial location and stitching the one or more images into an orthomosaic.

11. The method of claim 1 further comprising:

charging a battery of the UAV in the first geographic survey area; and charging the battery of the UAV in the second geographic survey area.

12. The method of claim 1 wherein at least one of the first plurality of flight missions comprises dropping a payload by the UAV.

13. The method of claim 1 wherein at least one of the first plurality of flight missions comprises loitering the UAV over an event of interest.

14. The method of claim 1 further comprising:

determining a UAV battery power level during the first plurality of flight missions; and autonomously re-routing the UAV to a landing location in the first geographic survey area if the determined UAV battery power level drops below a predetermined voltage threshold.

15. An unmanned aerial vehicle (UAV) surveying system comprising:

a first geographic survey area;

a second geographic survey area;

a UAV having a UAV processor, wherein the UAV processor is configured to:

receive two or more flight missions in the first geographic survey area;

determine completion of the two or more flight missions;

provide, based on the determined completion of the two or more flight missions, flight survey data from the received two or more flight missions in the first geographic survey area; and migrate, based on the determined completion of the two or more flight missions, the UAV from the first geographic survey area to the second geographic survey area.

16. The system of claim 15, wherein the first geographic survey area comprises at least one agricultural field in at least one crop phase.

17. The system of claim 16, wherein the crop phase is at least one of: a planting phase, an emergence phase, a growth phase, a harvest phase, and a clean-up phase.

18. The system of claim 17, wherein the provided flight survey data in the first geographic survey area relates to the at least one crop phase.

19. The system of claim 15, wherein the UAV processor is further configured to:

receive one or more flight missions in the second geographic survey area; and provide flight survey data from the received one or more flight missions in the second geographic survey area.

20. The system of claim 19 further comprising:

a first transceiver of the UAV;

wherein the provided flight survey data from the two or more flight missions in the first geographic survey area is sent by the first transceiver of the UAV; and wherein the provided flight survey data from the one or more flight missions in the second geographic survey area is sent by the first transceiver of the UAV.

* * * * *